(12) United States Patent
Nakamura

(10) Patent No.: US 10,747,055 B2
(45) Date of Patent: Aug. 18, 2020

(54) PLANAR LIGHT SOURCE DEVICE AND DISPLAY DEVICE

(71) Applicant: Enplas Corporation, Saitama (JP)

(72) Inventor: Masato Nakamura, Saitama (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 16/469,759

(22) PCT Filed: Aug. 15, 2017

(86) PCT No.: PCT/JP2017/029372
§ 371 (c)(1),
(2) Date: Jun. 14, 2019

(87) PCT Pub. No.: WO2018/109978
PCT Pub. Date: Jun. 21, 2018

(65) Prior Publication Data
US 2020/0089059 A1 Mar. 19, 2020

(30) Foreign Application Priority Data

Dec. 15, 2016 (JP) ................................ 2016-243414
Mar. 14, 2017 (JP) ................................ 2017-048871

(51) Int. Cl.
G02F 1/13357 (2006.01)
G02B 27/01 (2006.01)

(52) U.S. Cl.
CPC .... *G02F 1/133611* (2013.01); *G02B 27/0101* (2013.01); *G02F 1/133606* (2013.01);
(Continued)

(58) Field of Classification Search
CPC ......... G02F 1/133611; G02F 1/133606; G02B 27/0101; G02B 27/0118
See application file for complete search history.

(56) References Cited

U.S. PATENT DOCUMENTS

2007/0109779 A1 5/2007 Sekiguchi et al.
2011/0075434 A1 3/2011 Kurokawa
(Continued)

FOREIGN PATENT DOCUMENTS

| JP | 64-209 U | 1/1989 |
| JP | 2007-157686 A | 6/2007 |
| JP | 2011-076832 A | 4/2011 |

OTHER PUBLICATIONS

International Search Report from International Application No. PCT/JP2017/029372 dated Nov. 7, 2017.

*Primary Examiner* — Anabel Ton
(74) *Attorney, Agent, or Firm* — Brundidge & Stanger, P.C.

(57) ABSTRACT

When the focal distance of the first luminous flux control member is f, and the distance between a first central axis and an optical axis in the light emitting element separated farthest from the first central axis is d, the planar light source device satisfies $-0.6<d/f<0$. Also, when the width in the cross section including the central axis of the lens surface is w, the radius of curvature of the lens surface is R, and the distance between the diffusion member and the intersection point of the center line of the lens surface and the surface at the diffusion member side in the third luminous flux control member is t, the planar light source device satisfies $0<w2/t<0.85$ and $0.4<w/R<1.4$.

8 Claims, 23 Drawing Sheets

(52) U.S. Cl.
CPC .............. *G02B 2027/0118* (2013.01); *G02F 2001/133607* (2013.01)

(56) References Cited

U.S. PATENT DOCUMENTS

| | | | |
|---|---|---|---|
| 2017/0199382 A1* | 7/2017 | Nambara | G02B 27/0149 |
| 2018/0187841 A1* | 7/2018 | Nakamura | G02B 19/0066 |
| 2019/0225083 A1* | 7/2019 | Yatsu | G02B 27/0101 |
| 2020/0089059 A1* | 3/2020 | Nakamura | G02F 1/133611 |

\* cited by examiner

PLANAR LIGHT SOURCE DEVICE AND DISPLAY DEVICE

TECHNICAL FIELD

The present invention relates to a surface light source device including a light-emitting device including a plurality of light-emitting elements and a light flux controlling member, and a display device including the surface light source device.

BACKGROUND ART

In recent years, head-up displays (HUDs) which can directly display speed information and the like on a screen (for example, a windshield of a car) are used. In an exemplary HUD, the distribution of light emitted from a light-emitting element is controlled by a lens (light flux controlling member), and then the light is projected onto a screen through a liquid crystal panel and the like. In this case, the user can recognize the projected information with the reflection light from the screen.

In HUDs, a surface light source device using a plurality of light-emitting elements (for example, LEDs) can be employed as the light source. However, the surface light source device using a plurality of light-emitting elements might cause luminance unevenness with a high luminance region and a low luminance region on the emission surface of the surface light source device. In view of this, some methods have been proposed to reduce such luminance unevenness (for example, PTL 1).

FIG. 1A is a sectional view illustrating a configuration of surface light source device 10 disclosed in PTL 1, FIG. 1B is a schematic plan view illustrating lens array 14 provided in surface light source device 10 disclosed in PTL 1, FIG. 1C is a graph showing a luminance distribution (relative luminance) of light emitted from lens array 14 disclosed in PTL 1, and FIG. 1D is a graph showing a luminance distribution (relative luminance) of light emitted from a lens array having no irregularity at the boundary line between adjacent two lenses.

Surface light source device 10 disclosed in PTL 1 includes a plurality of LEDs 12 disposed on substrate 11, lens array 14, and diffusion member 15. As illustrated in FIG. 1A, seven LEDs 12 are disposed in a line on surface light source device 10. In addition, as illustrated in FIG. 1B, seven lenses 13 corresponding to seven LEDs 12 are disposed in a line on lens array 14. Irregular part 17 is formed on boundary line 16 between adjacent two lenses 13 of lens array 14. In surface light source device 10 disclosed in PTL 1, the light emitted from LED 12 is converged at lenses 13, and the converged light is diffused by diffusion member 15. At this time, the luminance of the light emitted from lens array 14 is equalized by irregular part 17. Thus, in comparison with the case where no irregularity is formed (see FIG. 1D), surface light source device 10 disclosed in PTL 1 reduces the difference in luminance between the high luminance region and the low luminance region (see FIG. 1C).

CITATION LIST

Patent Literature

PTL 1
Japanese Patent Application Laid-Open No. 2011-76832

SUMMARY OF INVENTION

Technical Problem

As illustrated in FIG. 1C, however, surface light source device 10 disclosed in PTL 1 cannot sufficiently reduce the luminance unevenness.

In view of this, an object of the present invention is to provide a surface light source device including a light-emitting device that causes less luminance unevenness while using a plurality of light-emitting elements. Another object of the present invention is to provide a display device including the surface light source device.

Solution to Problem

A surface light source device according to the present invention includes: a light-emitting device including a plurality of light-emitting elements and a light flux controlling member including a first light flux controlling member, a second light flux controlling member and a third light flux controlling member, the light flux controlling member being configured to control a distribution of light emitted from the plurality of light-emitting elements; and a diffusion member disposed with an air layer interposed between the diffusion member and the light-emitting device, the diffusion member being configured to be irradiated with light emitted from the light-emitting device. The first light flux controlling member includes a first incidence surface having a concave shape, the first incidence surface being disposed opposite the plurality of light-emitting elements so as to intersect a first central axis of the first light flux controlling member, and a first emission surface disposed opposite the first incidence surface and including an inner emission surface and an outer emission surface having a convex shape in a cross section including the first central axis, the inner emission surface being disposed so as to intersect the first central axis, the outer emission surface being disposed so as to surround the inner emission surface. The second light flux controlling member controls light emitted from the first light flux controlling member such that the light emitted from the first light flux controlling member travels in a direction along the first central axis. The third light flux controlling member includes a third incidence surface configured to allow incidence of light emitted from the second light flux controlling member, and a third emission surface disposed opposite the third incidence surface. A plurality of convex lens surfaces or a plurality of concave lens surfaces are two-dimensionally arranged in the third incidence surface or the third emission surface, each of the plurality of convex lens surfaces having a convex shape in a cross section including a third central axis of the third light flux controlling member, each of the plurality of concave lens surfaces having a concave shape in the cross section including the third central axis of the third light flux controlling member. Further, Expression (1), Expression (2) and Expression (3) are satisfied.

$$-0.6 < d/f < 0 \quad (1)$$

$$0 < w^2/t < 0.85 \quad (2)$$

$$0.4 < w/R < 1.4 \quad (3)$$

where f is a focal length of the first light flux controlling member, d is a distance between the first central axis and an optical axis of one of the plurality of the light-emitting elements that is remotest from the first central axis among the plurality of the light-emitting elements, w is a width of the convex lens surface or the concave lens surface in the cross section including the third central axis, R is a curvature radius of the convex lens surface or the concave lens, and t is a distance between the diffusion member and an intersection of a center line of the convex lens surface or the concave lens surface and one surface of the third light flux controlling member, the one surface of the third light flux controlling member being located on a diffusion member side.

According to the present invention display device according to the present invention surface light source device, the surface light source device light emitted from irradiated display member.

Advantageous Effects of Invention

According to the present invention, it is possible to provide a surface light source device including a light-emitting device that causes less luminance unevenness while using a plurality of light-emitting elements, and a display device including the surface light source device.

DESCRIPTION OF EMBODIMENTS

An embodiment of the present invention is elaborated below with reference to the accompanying drawings. In the following description, a display device which can be used for displaying screen information in an HUD is described. The HUD includes a display device, a screen, and a projection lens for appropriately projecting light from the display device onto the screen. The light emitted from the display device is applied onto the screen through an optical projection system including a projection lens and the like.

Embodiment 1

Configurations of Surface Light Source Device and Display Device

Figure 1A:
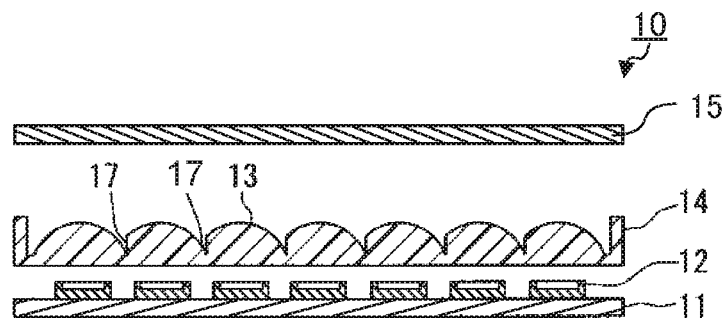
FIGS. 1A and 1B are drawings for describing a configuration of a surface light source device disclosed in PTL 1.
Figure 1B:
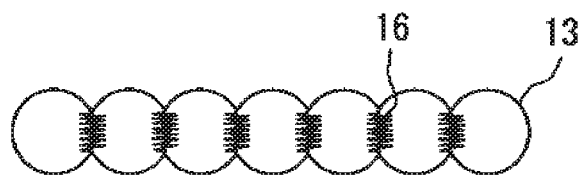
Figure 1C:
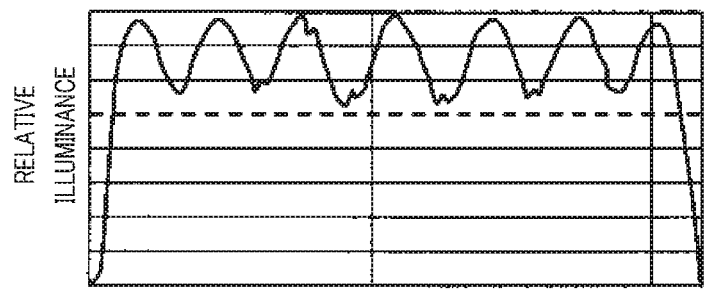
FIGS. 1C and 1D are graphs for describing a luminance distribution of light emitted from a lens array.
Figure 1D:
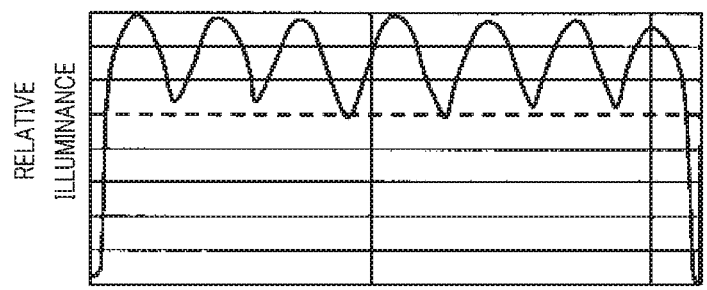
Figure 2A:
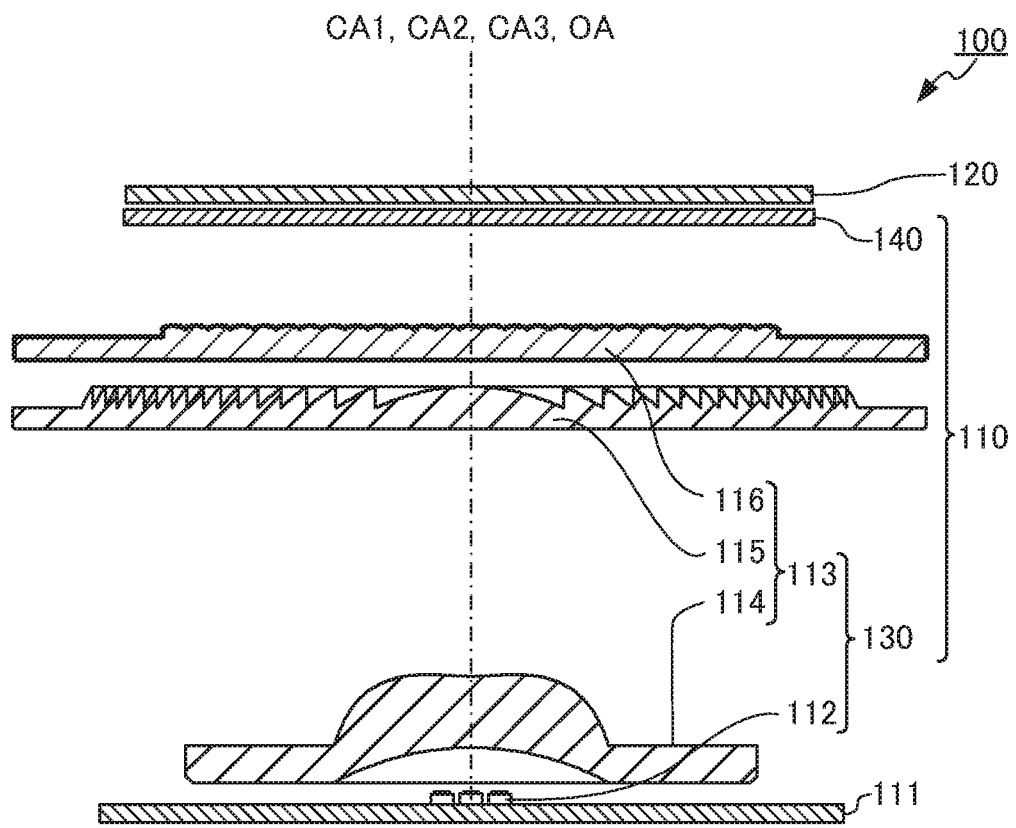
FIG. 2A is a sectional view of a display device according to Embodiment 1 of the present invention.
Figure 2B:
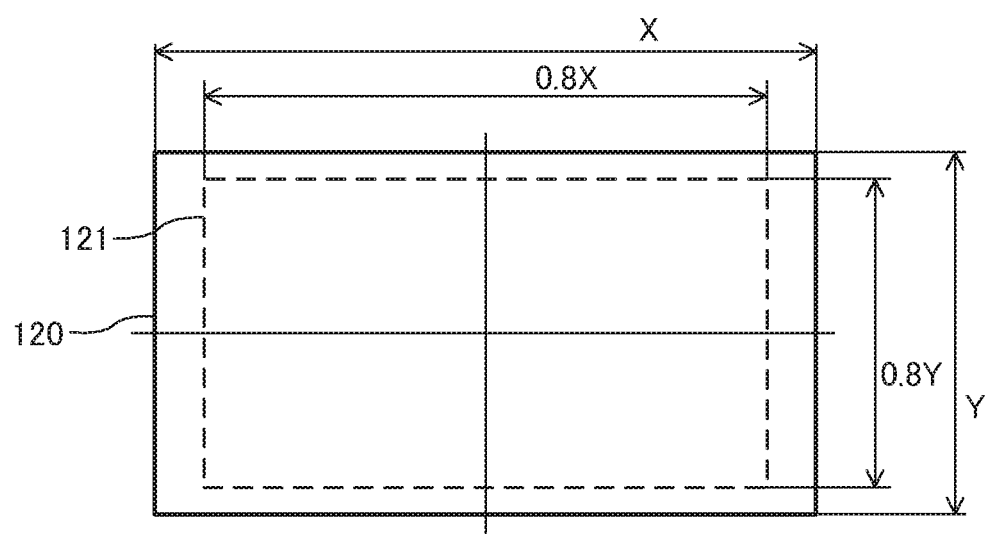
FIG. 2B illustrates a display region of the display device illustrated in FIG. 2A.

FIG. 2A is a sectional view of display device 100 according to Embodiment 1 of the present invention, and FIG. 2B illustrates display region 121 of display device 100 illustrated in FIG. 2A. In FIG. 2A, illustration of the first to third leg parts is omitted.

As illustrated in FIGS. 2A and 2B, display device 100 according to Embodiment 1 includes surface light source device 110 and display member 120.

Surface light source device 110 is a light source of display device 100. Surface light source device 110 includes light-emitting device 130 and diffusion member 140. Light-emitting device 130, which is disposed on substrate 111, includes a plurality of light-emitting elements 112 and light flux controlling member 113 including first light flux controlling member 114, second light flux controlling member 115 and third light flux controlling member 116.

Substrate 111 supports light-emitting elements 112 and light flux controlling member 113. The type of substrate 111 is not limited. In view of supplying electricity to light-emitting element 112, it is preferable to use a circuit board as substrate 111. For example, substrate 111 is a substrate such as a glass composite substrate, a glass epoxy substrate, and an Al substrate.

Light-emitting element 112 is the light source of surface light source device 110, and is fixed on substrate 111. For example, light-emitting element 112 is a light-emitting diode (LED). The colors of the light emitted from light-emitting elements 112 may be identical to each other or different from each other. In the present embodiment, the colors of the light emitted from light-emitting elements 112 are identical to each other. In addition, the color of the light emitted from light-emitting element 112 is not limited. The color of the light emitted from light-emitting element 1122 can be white, red, blue, green and the like. Normally, the intensity of the light emitted from light-emitting element 112 is highest in the direction of the normal to the light-emitting surface of light-emitting element 112.

The number of light-emitting elements 112 may be appropriately changed in accordance with the size of display member 120, the distance between substrate 111 and display member 120, and the like. In the present embodiment, three light-emitting elements 112 are provided. Placement of light-emitting elements 112 is not limited. Light-emitting elements 112 may be disposed on a straight line, or may be disposed at positions corresponding to vertices of a polygon, or, may be disposed on a circle. In the present embodiment, light-emitting elements 112 are disposed on a straight line.

In addition, in the present embodiment, light-emitting elements 112 are disposed in such a manner that the optical axis of light-emitting element 112 disposed at the center coincides with first central axis CA1 (second central axis CA2 and third central axis CA3). Here, the "optical axis of light-emitting element 112" is the travelling direction of light at the center of the total light flux which is stereoscopically emitted from light-emitting element 112. In addition, the "optical axis of a plurality of light-emitting elements 112" is the travelling direction of light at the center of the total light flux that is stereoscopically emitted from the plurality of light-emitting elements 112. In addition, the distance between light-emitting elements 112 adjacent to each other (the distance between the optical axes of light-emitting elements 112 adjacent to each other) is not limited.

Light flux controlling member 113 controls the distribution of light emitted from light-emitting element 112. Light flux controlling member 113 includes first light flux controlling member 114, second light flux controlling member 115 and third light flux controlling member 116. First central axis CA1 of first light flux controlling member 114, second central axis CA2 of second light flux controlling member 115, and third central axis CA3 of third light flux controlling member 116 may or may not coincide with one another. In the present embodiment, first central axis CA1 of first light flux controlling member 114, second central axis CA2 of second light flux controlling member 115, and third central axis CA3 of the third light flux controlling member coincide with one another.

First light flux controlling member 114, second light flux controlling member 115, and third light flux controlling member 116 are disposed in this order in the direction from light-emitting element 112 side to diffusion member 140 side. First light flux controlling member 114 is disposed on light-emitting element 112 side, and second light flux controlling member 115 is disposed (on diffusion member 140 side) at a position farther from light-emitting element 112 in comparison with first light flux controlling member 114. Further, third light flux controlling member 116 is disposed (diffusion member 140 side) at a position farther from light-emitting element 112 in comparison with second light flux controlling member 115. First light flux controlling member 114 (first incidence surface 131 and first emission surface 132 (see FIG. 3)) is rotationally symmetrical about first central axis CA1 as the rotation axis, and second light flux controlling member 115 (second incidence surface 141 and second emission surface 142 (see FIG. 4)) is rotationally symmetrical about second central axis CA2 as the rotation axis.

The materials of first light flux controlling member 114, second light flux controlling member 115 and third light flux controlling member 116 may be identical to each other or different from each other. Examples of the materials of first light flux controlling member 114, second light flux controlling member 115 and third light flux controlling member 116 include: optically transparent resins such as polymethylmethacrylate (PMMA), polycarbonate (PC), and epoxy resin (EP), and optically transparent glass. First light flux controlling member 114, second light flux controlling member 115 and third light flux controlling member 116 are manufactured by injection molding for example. The configurations of first light flux controlling member 114, second light flux controlling member 115 and third light flux controlling member 116 will be described later.

Diffusion member 140 allows light emitted from surface light source device 110 to pass therethrough while diffusing the light. Examples of diffusion member 140 include a plate-shaped transparent member provided with a light diffusion treatment (for example, a roughening treatment), and a plate-shaped transparent member added with a scattering member such as beads.

Display member 120 is a liquid crystal panel, for example. Display member 120 includes display region 121 in which to display an image to be projected onto the screen. Display region 121 is uniformly illuminated with light controlled by surface light source device 110. Note that, in the present embodiment, display region 121 is a region represented by 0.8X×0.8Y, where X represents the long side of display member 120 and Y represents the short side of display member 120 (see FIG. 2B).

The distribution of light emitted from light-emitting element 112 is controlled by first light flux controlling member 114, second light flux controlling member 115 and third light flux controlling member 116. Light emitted from third light flux controlling member 116 passes through diffusion member 140 while being diffused by diffusion member 140, so as to uniformly illuminate display member 120.

Configuration of Light Flux Controlling Member

Figures 3A, 3C:
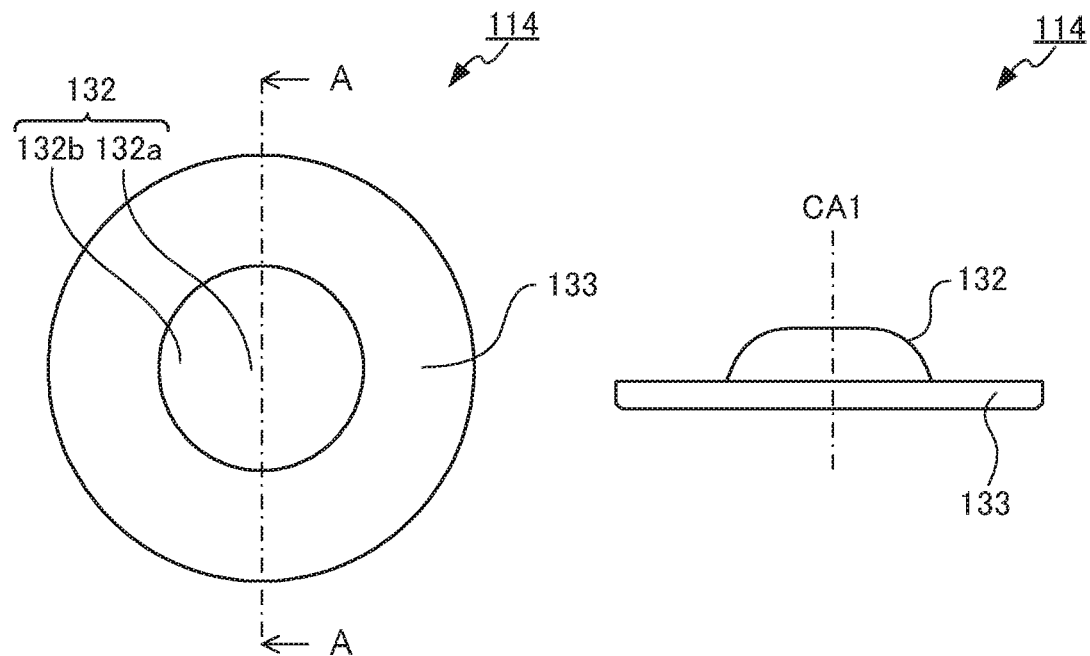
FIG. 3A to FIG. 3D illustrate a configuration of a first light flux controlling member.
Figures 3B, 3D:
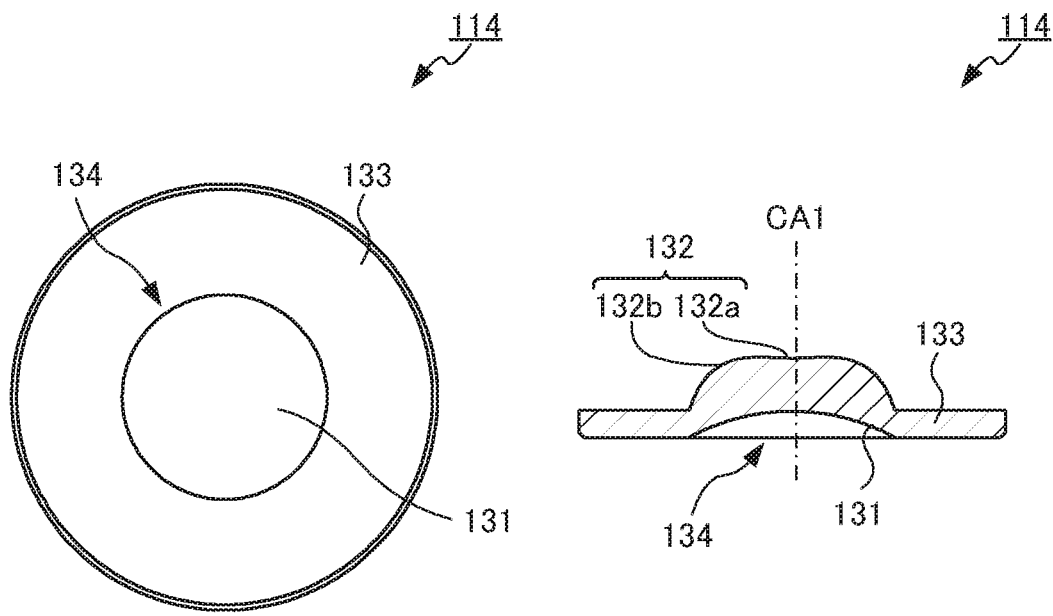

As described above, light flux controlling member 113 includes first light flux controlling member 114, second light flux controlling member 115, and third light flux controlling member 116. FIG. 3A to FIG. 3D illustrate a configuration of first light flux controlling member 114. FIG. 3A is a plan view of first light flux controlling member 114, FIG. 3B is a bottom view of first light flux controlling member 114, FIG. 3C is a side view of first light flux controlling member 114, and FIG. 3D is a sectional view of first light flux controlling member 114 taken along line A-A of FIG. 3A.

First light flux controlling member 114 controls the distribution of the light emitted from light-emitting element 112. As FIG. 3A to FIG. 3D illustrate, first light flux controlling member 114 includes first incidence surface 131 and first emission surface 132. Note that first light flux controlling member 114 may be provided with first flange 133. In addition, a first leg part (omitted in the drawing) for fixing first light flux controlling member 114 to substrate 111 may be provided on the rear side of first flange 133. First light flux controlling member 114 is disposed so as to face light-emitting element 112. The way of fixing First light flux controlling member 114 to substrate 111 is not limited, and second light flux controlling member 115 may be fixed by bonding, screw-fixing, fixing with a holder, or the like. For example, first light flux controlling member 114 and substrate 111 are fixed to each other by bonding the first leg part to substrate 111 with an adhesive agent.

First incidence surface 131 allows the light emitted from light-emitting element 112 to enter first light flux controlling member 114, and refracts the light toward first emission surface 132. First incidence surface 131 is disposed so as to face the light-emitting surface of light-emitting element 112 and to intersect first central axis CA1. The shape of first incidence surface 131 is not limited as long as it can serve the above-described function. In the present embodiment, first incidence surface 131 is the inner surface of first recess 134 disposed opposite the light-emitting surface of light-emitting element 112. First incidence surface 131 may be a spherical surface, or an aspherical surface. In the present embodiment, first incidence surface 131 has a negative power for a part of the light emitted from light-emitting element 112. Specifically, first incidence surface 131 has a concave lens shape, and first incidence surface 131 is an aspherical surface.

First emission surface 132 emits, to the outside, the light having advanced inside first light flux controlling member 114. First emission surface 132 is disposed on the side (second light flux controlling member 115 side) opposite to first incidence surface 131. First emission surface 132 includes first inner emission surface 132a and first outer emission surface 132b.

First inner emission surface 132a is disposed so as to intersect first central axis CA1. The shape of first inner emission surface 132a is not limited as long as the emitted light is spread away from first central axis CA1. Specifically, first inner emission surface 132a is formed in a recessed shape in the case where it is intended to further spread, away from first central axis CA, the light flux reaching first inner emission surface 132a. In this case, first inner emission surface 132a has a negative power for the light having reached first inner emission surface 132a. On the other hand, first inner emission surface 132a is formed in a gentle projection shape in the case where it is intended to prevent excessive spreading of the light reaching first inner emission surface 132a from flux first central axis CA. In this case, first inner emission surface 132a has a positive power for the light having reached first inner emission surface 132a. In each case, the light emitted from first inner emission surface 132a is controlled in such a manner that the light spreads away from first central axis CA1.

First outer emission surface 132b is disposed so as to surround first inner emission surface 132a at a position distanced from first central axis CA1 in comparison with first inner emission surface 132a. First outer emission surface 132b refracts (condenses), toward first central axis CA1 side, a part of the light incident on first incidence surface 131. In other words, first outer emission surface 132b has a positive power for the light which is emitted from light-emitting element 112 with a large emission angle with respect to first central axis CA1. First outer emission surface 132b has a convex lens shape, and first outer emission surface 132b is an aspherical surface.

Figures 4A, 4C:
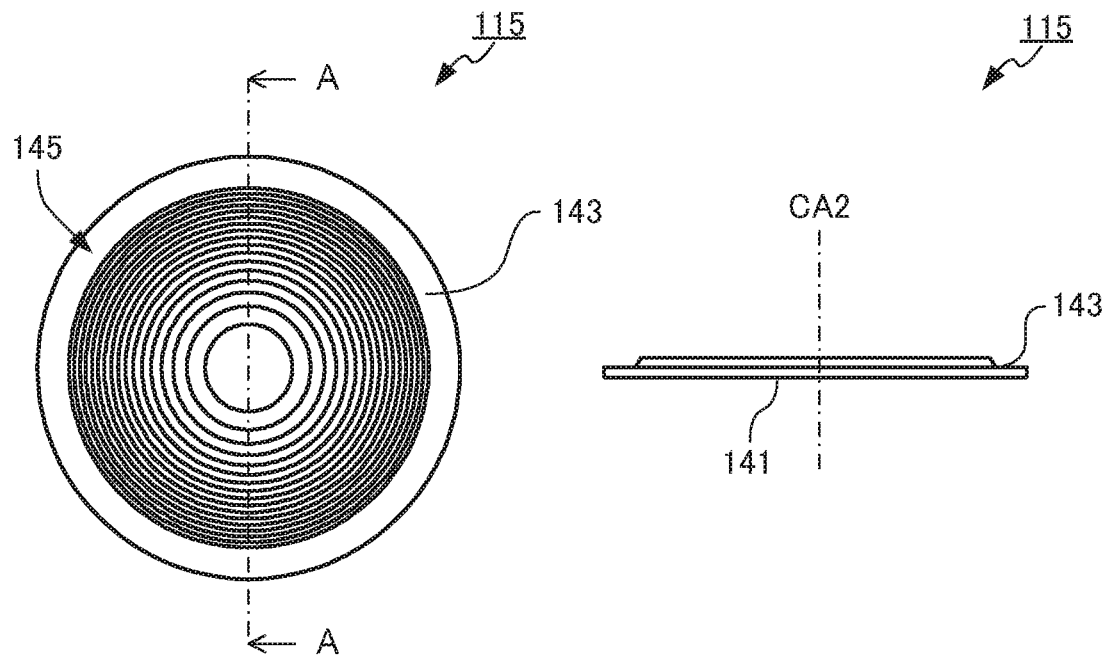
FIG. 4A to FIG. 4D illustrate a configuration of a second light flux controlling member.
Figures 4B, 4D:
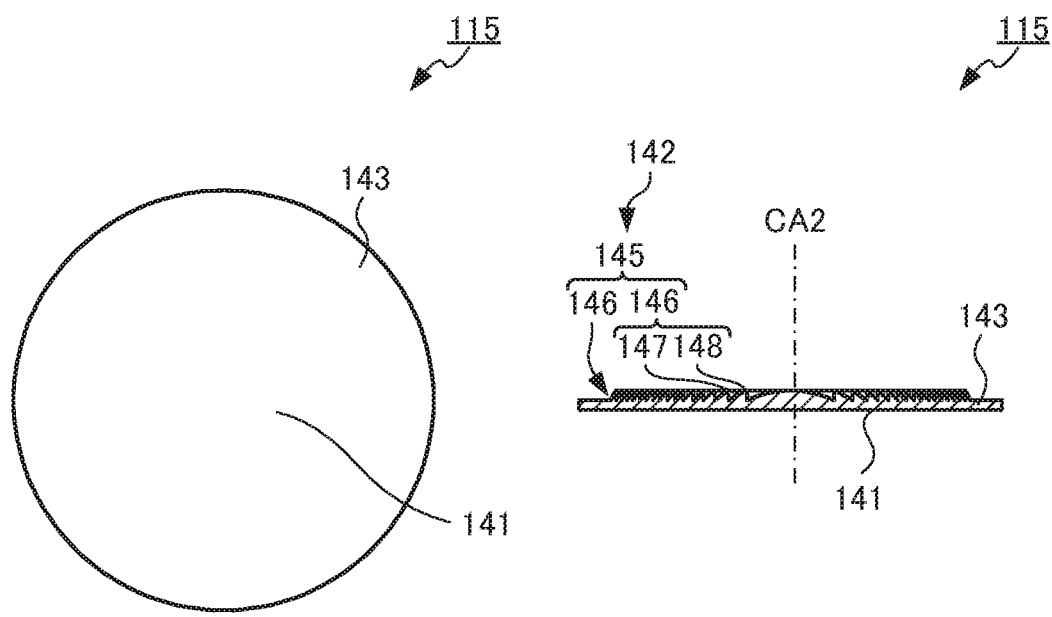
Figure 5A:
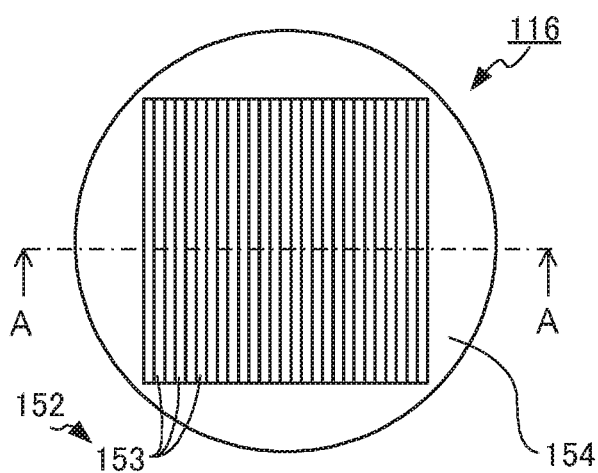
FIGS. 5A to 5D illustrate a configuration of a third light flux controlling member.
Figure 5C:
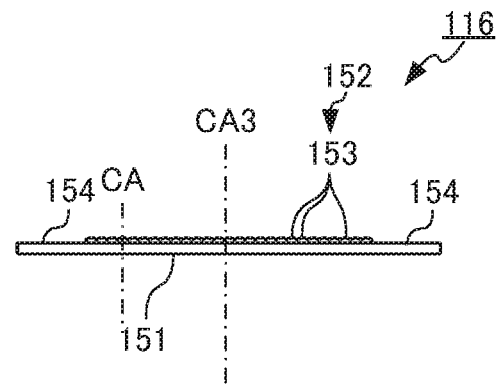
Figure 5B:
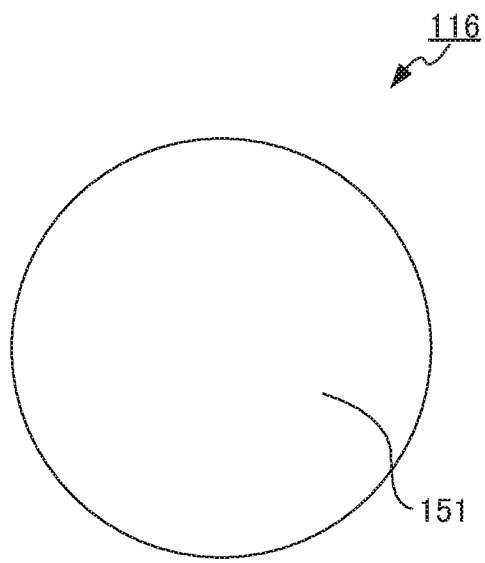
Figure 5D:
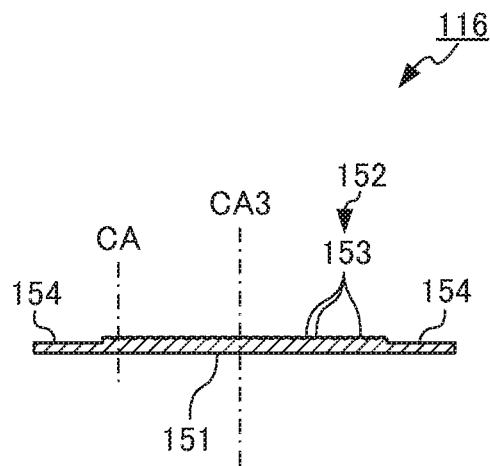

FIG. 4A to FIG. 4D illustrate a configuration of second light flux controlling member 115. FIG. 4A is a plan view of second light flux controlling member 115, FIG. 4B is a bottom view of second light flux controlling member 115, FIG. 4C is a side view of second light flux controlling member 115, and FIG. 4D is a sectional view of second light flux controlling member 115 taken along line A-A of FIG. 4A.

Second light flux controlling member 115 controls the light emitted from first light flux controlling member 114 in such a manner that the light is approximately parallel light. As illustrated in FIG. 4A to FIG. 4D, second light flux controlling member 115 includes second incidence surface 141 and second emission surface 142. The shape of second light flux controlling member 115 is not limited as long as it can serve the above-described function. Second light flux controlling member 115 may include a convex lens surface in second incidence surface 141, and may include a convex lens surface in second emission surface 142. In addition, from the viewpoint of downsizing, second light flux controlling member 115 may include a refractive fresnel lens part, or a reflective fresnel lens part. In the present embodiment, second light flux controlling member 115 includes refractive fresnel lens part 145 in second emission surface 142. In comparison with second light flux controlling member 115 including a reflective type fresnel lens part, second light flux controlling member 115 including refractive fresnel lens part 145 can absorb assembling errors. Note that second light flux controlling member 115 may be provided with second flange 143. In addition, a second leg part (omitted in the drawing) for fixing second light flux controlling member 115 to substrate 111 may be provided on the rear side of second flange 143. The way of fixing second light flux controlling member 115 to substrate 111 is not limited, and second light flux controlling member 115 may be fixed by bonding, screw-fixing, fixing with a holder, or the like. For example, second light flux controlling member 115 and substrate 111 are fixed to each other by bonding the second leg part to substrate 111 with an adhesive agent.

Second incidence surface 141 allows the light emitted from first light flux controlling member 114 to enter second light flux controlling member 115 and refracts the light toward fresnel lens part 145. The shape of second incidence surface 141 is not limited as long as it can serve the above-described function. In the present embodiment, second incidence surface 141 is a plane surface.

Second emission surface 142 emits, to the outside, the light having advanced inside second light flux controlling member 115, and refracts the light in such a manner that the light is approximately parallel to second central axis CA2. Second emission surface 142 includes fresnel lens part 145. Fresnel lens part 145 includes a plurality of protrusions 146 which are concentrically disposed in a circular shape in plan view.

Each protrusion 146 includes refracting surface 147 that refracts incident light, and connection surface 148 that connects adjacent refracting surfaces 147. In protrusion 146, refracting surface 147 is disposed on the outer side, and connection surface 148 is disposed on the inner side (second central axis CA2 side). Note that a plurality of refracting surfaces 147 are designed such that the light emitted from light-emitting element 112 whose optical axis OA coincides with first central axis CA1 (second central axis CA2) of first light flux controlling member 114 (second light flux controlling member 115) becomes parallel light.

Figure 6A:
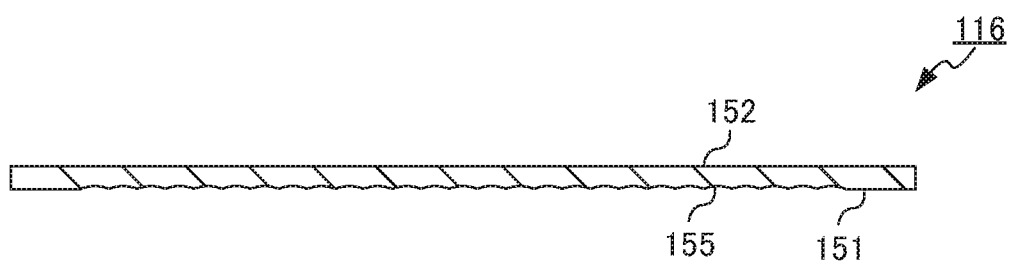
FIGS. 6A and 6B are sectional views of another third light flux controlling member.
Figure 6B:
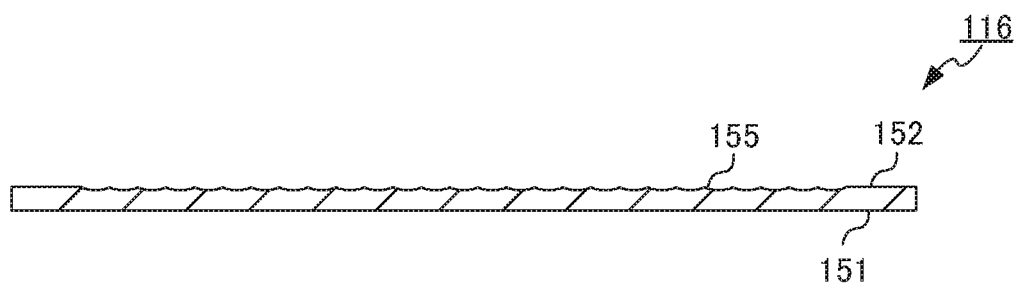

FIG. 5 illustrates a configuration of third light flux controlling member 116. FIG. 5A is a plan view of third light flux controlling member 116, FIG. 5B is a bottom view of third light flux controlling member 116, FIG. 5C is a side view of third light flux controlling member 116, and FIG. 5D is a sectional view taken along line A-A of FIG. 5A. FIGS. 6A and 6B are sectional views illustrating another third light flux controlling member 116.

Third light flux controlling member 116 emits, toward diffusion member 140, light emitted from second light flux controlling member 116 while controlling the light such that luminance unevenness is not caused. As illustrated in FIGS. 5A to 5D, third light flux controlling member 116 includes third incidence surface 151 and third emission surface 152. Note that, third light flux controlling member 116 may include third flange 154. Third incidence surface 151 allows entrance of light emitted from second light flux controlling member 115. In the example illustrated in FIG. 5, third incidence surface 151 has a planer shape.

Third emission surface 152, which is disposed on the side opposite to third incidence surface 151, emits, toward diffusion member 140, the light having traveled inside third light flux controlling member 116. In a cross section including third central axis CA3, third emission surface 152 includes a plurality of concave lens surfaces or a plurality of convex lens surfaces 153 of a convex shape. The "third central axis CA3" means a center portion of third emission surface 152 in a plan view of third light flux controlling member 116. In addition, "in a cross section including third central axis CA3" means a cross section taken along a plane including third central axis CA3 and the second direction described later. While third light flux controlling member 116 includes convex lens surface 153 in third emission surface 152 in the example illustrated in FIG. 5, such a configuration is not a limitation, and convex lens surface 153 may be provided in third incidence surface 151. In addition, concave lens surface 155 may be provided in third incidence surface 151 as illustrated in FIG. 6A, or concave lens surface 155 may be provided in third emission surface 152 as illustrated in FIG. 6B. Note that, in the case where convex lens surface 153 is disposed in third incidence surface 151 and third emission surface 152, the light collection efficiency of light having passed through the double-sided convex lens is required to be adjusted so as to achieve the light collection efficiency equivalent to that of a one-sided convex lens, and/or alignment of the convex lens on one side and the convex lens on the other side is required. As such, in comparison with the case where convex lens surface 153 is disposed in one side, forming convex lens surface 153 on both sides have more difficulty in achieving highly accurate third light flux controlling member 116.

Convex lens surface 153 is a curved surface that has a ridgeline linearly extending in a first direction, which is perpendicular to the thickness direction of third light flux controlling member 116, and has a curvature only in a second direction, which is perpendicular to the thickness direction and the first direction. That is, convex lens surface 153 according to the present embodiment has a cylindrical structure. In addition, a plurality of convex lens surfaces 153 are disposed in the second direction with no gap therebetween. In a cross section including third central axis CA3, convex lens surface 153 may have an arc shape, or a curve whose curvature radius increases as the distance from the apex increases, or, a curve including an arc at a portion intersecting third central axis CA3, and having a curvature radius that increases as the distance from the arc increases. Note that the thickness direction of third light flux controlling member 116 is a direction along third central axis CA3.

In addition, a third leg part (omitted in the drawing) for fixing third light flux controlling member 116 to substrate 111 may be provided on the rear side of third flange 154. The method of fixing third light flux controlling member 116 to substrate 111 is not limited, and an adhesive, a screw, a holder and the like may be employed for the fixing. For example, third light flux controlling member 116 and substrate 111 may be fixed to each other by bonding the third leg part to substrate 111 with an adhesive agent.

As described above, third light flux controlling member 116 may include a plurality of concave lens surfaces 155 in third incidence surface 151 or third emission surface 152 as illustrated in FIGS. 6A and 6B. Concave lens surface 155 is a curved surface that has a ridgeline linearly extending in the first direction perpendicular to the thickness direction of third light flux controlling member 116, and has a curvature only in the second direction perpendicular to the thickness direction and the first direction. A plurality of concave lens surfaces 155 are disposed in the second direction with no gap therebetween. In a cross section including third central axis CA3, concave lens surface 155 may have an arc shape, or a curve whose curvature radius increases as the distance from the apex increases, or, a curve including an arc at a portion intersecting third central axis CA3, and having a curvature radius that increases as the distance from the arc increases. Note that the thickness direction of third light flux controlling member 116 is a direction along third central axis CA3.

Figure 7:
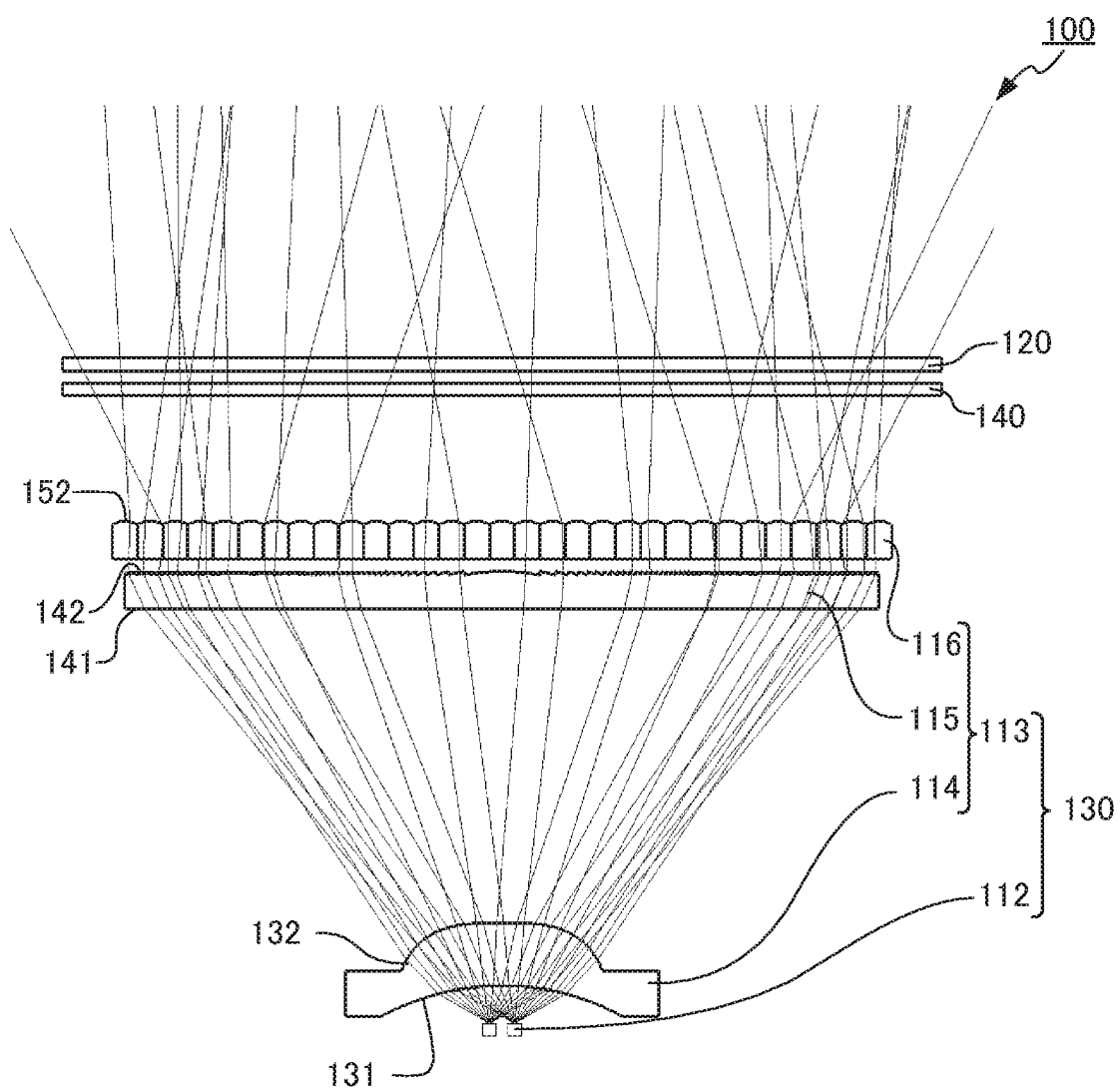
FIG. 7 illustrates light paths in a display device.

FIG. 7 illustrates light paths in display device 100. In FIG. 7, hatching is omitted to illustrate light paths. As illustrated in FIG. 7, light emitted from each light-emitting element 112 is controlled by first light flux controlling member 114 such that the light is mixed at the time when the light reaches second light flux controlling member 115, and then the light is emitted from first emission surface 132. The light emitted from first light flux controlling member 114 reaches second light flux controlling member 115. At this time, the light beam density of the light reaching second light flux controlling member 115 is controlled in such a manner that the light beam density is low at a center portion and high at a peripheral portion. In other words, at second incidence surface 141 of second light flux controlling member 115, the luminous intensity in the proximity of the optical axis is low, and the luminous intensity at a large angle to the optical axis is high. As a result, the illuminance in second light flux controlling member 115 is uniform in its entirety including the region around the optical axis and the peripheral portion. The light having reached second light flux controlling member 115 is controlled by second light flux controlling member 115 such that the light becomes approximately parallel, and then the light is emitted from second emission surface 142. The light emitted from second light flux controlling member 115 reaches third light flux controlling member 116. The light having reached third light flux controlling member 116 is controlled by third light flux controlling member 116 such that the luminance is uniform even when display device 100 is viewed in an oblique direction, and then the light is emitted from third emission surface 152. Display member 120 is illuminated with the light emitted from third emission surface 152 such that the luminance is uniform even when display device 100 is viewed in an oblique direction.

The light emitted from light-emitting element 112 is controlled by first light flux controlling member 114 and second light flux controlling member 115 such that the light is approximately parallel to the optical axis. Then, the light controlled by first light flux controlling member 114 and second light flux controlling member 115 enters third light flux controlling member 116. From the viewpoint of improving the use efficiency of the light emitted from light-emitting element 112, it is preferable that the most part of the light emitted from first light flux controlling member 114 enter second light flux controlling member 115. In view of this, the distance between first light flux controlling member 114 and second light flux controlling member 115 is set such that the most part of the light emitted from first light flux controlling member 114 enters light second light flux controlling member 115.

In the display device 100, light-emitting element 112 and light flux controlling member 113 are disposed in such a manner as to satisfy the following Expression (1).

$$-0.6 < d/f < 0 \qquad (1)$$

where d is the distance between first central axis CA1 of first light flux controlling member 114 and optical axis OA of light-emitting element 112 which is the most remote light-emitting element from central axis CA1 of first light flux controlling member 114 (hereinafter also simply referred to as "distance d"). In addition, f is the focal length of first light flux controlling member 114 (hereinafter referred to also simply as "focus distance f").

Figure 8A:
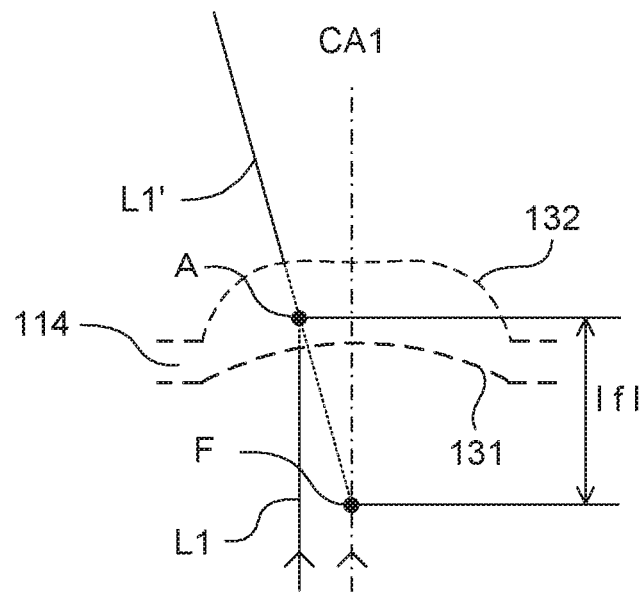
FIGS. 8A and 8B are drawings for describing a relationship between a light flux controlling member and a light-emitting element.
Figure 8B:
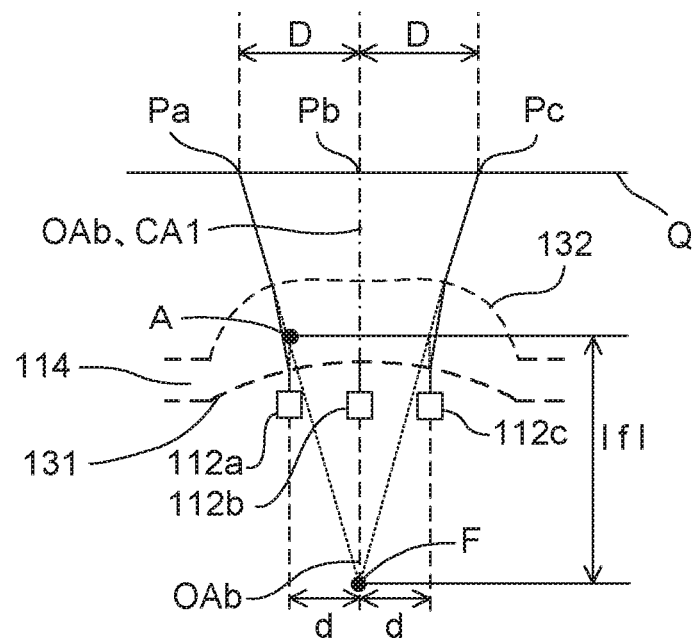
Figure 9A:
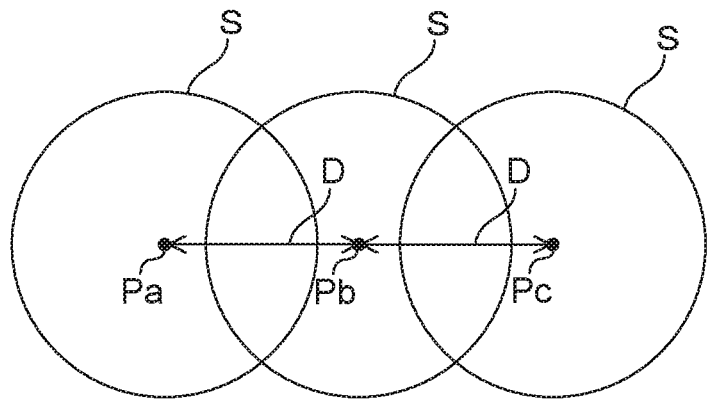
FIGS. 9A and 9B are drawings for describing an irradiation region.
Figure 9B:
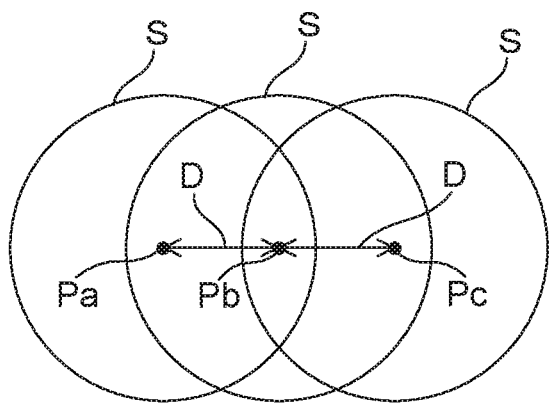

With reference to FIGS. 8 and 9, a relationship between light-emitting element 112 and light flux controlling member 113 is described. FIG. 8A is a drawing for describing focal length f of first light flux controlling member 114, and FIG. 8B is a drawing for describing a relationship between focus distance f and distance d. FIGS. 9A and 9B are drawings for describing illumination region S. FIG. 9A is a drawing for describing an illumination region in the case where distance d is long, and FIG. 9B is a drawing for describing an illumination region in the case where distance d is short.

As a lens in its entirety, first light flux controlling member 114 functions in the direction expanding the light emitted from light-emitting element 112, and as such focal length f is defined as follows. For focal length f of first light flux controlling member 114, it is first assumed that virtual incident light L1 that is parallel to first central axis CA1 of first light flux controlling member 114 is entered from first incidence surface 131 side as illustrated in FIG. 8A. Next, virtual emission light L1' that is virtual incident light L1 emitted from first emission surface 132 is assumed. Next, the intersection of virtual incident light L1 extended in the incident direction and virtual emission light L1' extended in the direction opposite to the emission direction is set as main point A. Next, the intersection of a virtual line obtained by further extending virtual emission light L1' emitted from first emission surface 132 in the direction opposite to the emission direction, and first central axis CA1 of first light flux controlling member 114 is set as focus F. Here, the distance between main point A and focus F along first central axis CA1 is focus distance f. In the present embodiment, focus distance f has a negative value.

Next, a relationship between focus distance f and distance d is described. Here, it is assumed that three light-emitting elements 112a, 112b and 112c arranged in a line in such a manner that the center-to-center distance of the optical axes is distance d, and one first light flux controlling member 114 are provided as illustrated in FIG. 8B. In addition, it is assumed that optical axis OAb of light-emitting element 112b disposed at the center coincides with first central axis CA1 of first light flux controlling member 114. That is, light-emitting element 112 which is the most remote light-emitting element from first central axis CA1 of first light flux controlling member 114 is light-emitting element 112a (light-emitting element 112c). Further, arrival points of virtual emission light emitted from light-emitting elements 112a, 112b and 112c at virtual illuminated surface Q (corresponding to diffusion member 140 of the present embodiment) are represented by Pa, Pb and Pc, respectively.

As illustrated in FIG. 8B, when distance d (the center-to-center distance of light-emitting elements 112 adjacent to each other) between first central axis CA1 of first light flux controlling member 114 and optical axis OA of light-emitting element 112a (112c), which is the most remote light-emitting element from first central axis CA1, increases, distance D between the arrival points of the light beams emitted from light-emitting elements 112a, 112b and 112c on the virtual plane increases. Here, since the light emitted from light-emitting elements 112a, 112b and 112c illuminates predetermined regions (illumination regions S) on the virtual plane, the overlapping area of illumination regions S illuminated by light-emitting elements 112a, 112b and 112c decreases (see FIG. 9A). Conversely, when distance d is reduced, the overlapping area of illumination regions S illuminated by light-emitting elements 112a, 112b and 112c increases (see FIG. 9B). In this manner, the overlapping area of the illumination regions of light-emitting elements 112a, 112b and 112c can be adjusted by adjusting distance d.

On the other hand, as illustrated in FIG. 8B, when focus distance f of first light flux controlling member 114 is reduced, distance D between the arrival points of the light beams emitted from light-emitting elements 112a, 112b and 112c on the virtual plane increases. Here, since the light emitted from light-emitting elements 112a, 112b and 112c illuminates predetermined regions (illumination regions S) on the virtual plane, the overlapping area of illumination regions S illuminated by light-emitting elements 112a, 112b and 112c decreases (see FIG. 9A). Conversely, when focus distance f is increased, the overlapping area of illumination regions S illuminated by light-emitting elements 112a, 112b and 112c increases (see FIG. 9B). In this manner, the overlapping area of the illumination regions of light-emitting elements 112a, 112b and 112c can be adjusted by adjusting focus distance f.

As described above, distance d and focus distance f largely affect the uniformity on display member 120 described later. To be more specific, when d/f is reduced to −0.6 or smaller in response to the increase in d, the overlapping region of illumination regions S of the light emitted from light-emitting elements 112 is reduced. In particular, in the case where the screen has a rectangular shape, the overlapping area is reduced in the longitudinal (long side) direction than in the short (short side) direction, and consequently sufficient luminance cannot be ensured at end portions in the longitudinal direction. On the other hand, when the peripheral regions are brightened by reducing f, the absolute value of d/f is further reduced, and the overlapping region of illumination regions S is further reduced.

When d/f is greater than 0, the positive power of first light flux controlling member 114 is excessively high, and the light beam density at the center portion is higher than that of the peripheral portions, thus leading to high luminance at the center portion.

On the other hand, when d/f satisfies −0.6<d/f<0, the illumination regions of the light emitted from light-emitting elements 112 appropriately overlap each other, and as a result, luminance unevenness is suppressed.

In the above-described display device 100, light flux controlling member 113 and diffusion member 140 further satisfy Expression (2) and Expression (3).

$$0 < w^2/t < 0.85 \quad (2)$$

$$0.4 < w/R < 1.4 \quad (3)$$

where w represents a width of convex lens surface 153 or concave lens surface 155 in the cross section including third central axis CA3; R represents a curvature radius of the convex lens surface or concave lens surface 155; and t represents the distance between diffusion member 140 and an intersection (the apex of the convex lens surface 153 or the valley bottom of concave lens surface 155) of the center line of convex lens surface 153 or concave lens surface 155 and the surface of third light flux controlling member 116 on the diffusion member 140 side.

Figure 10A:
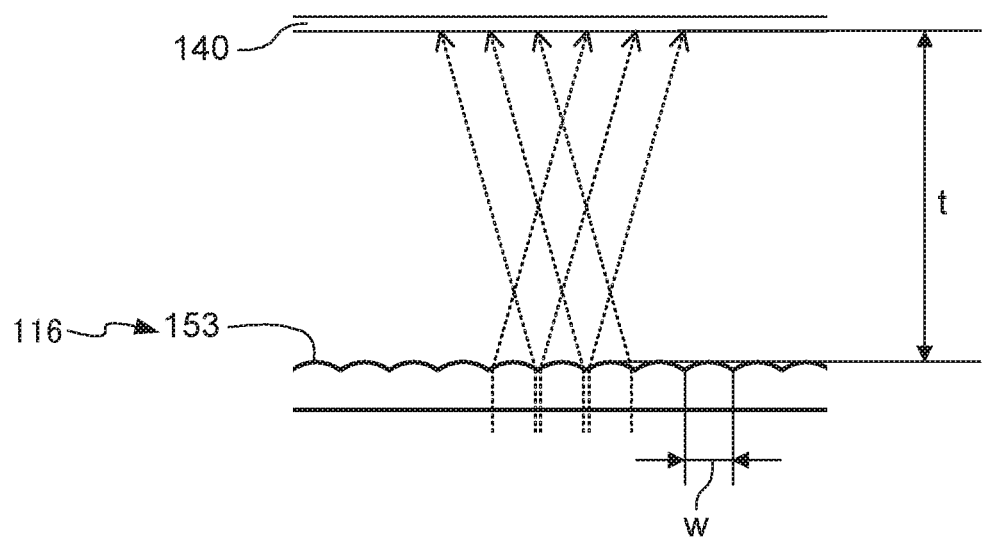
FIGS. 10A and 10B are drawings for describing Expression (2)
Figure 10B:
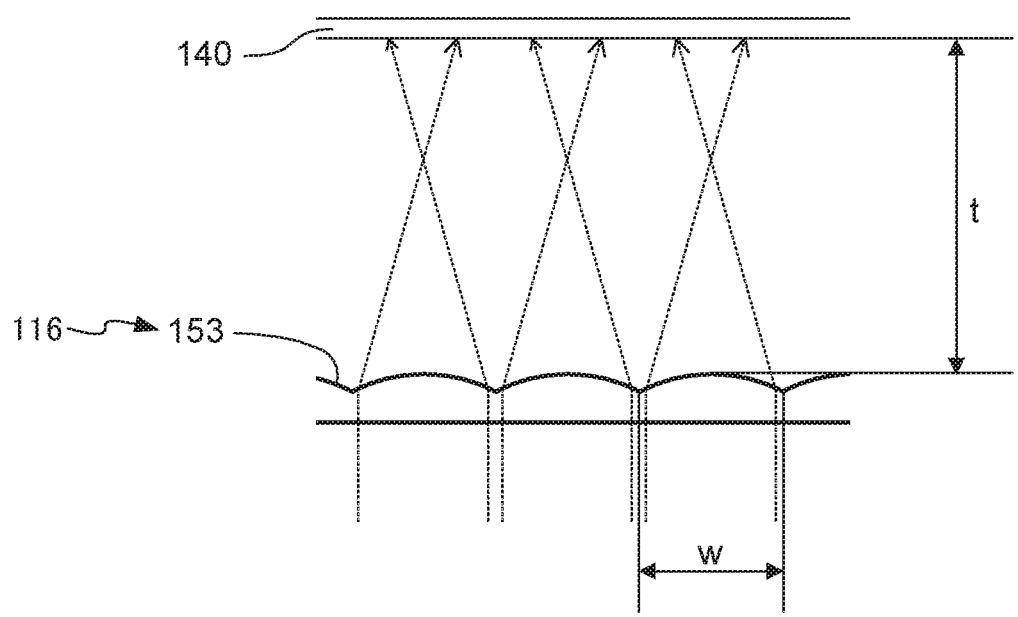

Now a relationship between third light flux controlling member 116 and diffusion member 140 is described with reference to FIGS. 10 and 11. FIG. 10A illustrates a relationship between diffusion member 140 and third light flux controlling member 116 according to the present embodiment, and FIG. 10B illustrates a relationship between diffusion member 140 and third light flux controlling member 116 according to a comparative example. Note that, hatching of third light flux controlling member 116 and diffusion member 140 is omitted in FIGS. 10A and 10B to illustrate light paths. While third light flux controlling member 116 in which convex lens surface 153 is provided in third emission surface 152 is described as an example here, the same applies to third light flux controlling member 116 in which convex lens surface 153 is provided in third incidence surface 151. The same applies also to third light flux controlling member 116 in which concave lens surface 155 is provided in third incidence surface 151 or third emission surface 152.

As illustrated in FIG. 10A, in the case of display device 100 in which third light flux controlling member 116 and diffusion member 140 are disposed such that $w^2/t$ is greater than 0 and smaller than 0.85, light beams emitted from convex lenses 153 overlap on diffusion member 140, and thus luminance unevenness can be suppressed. In addition, the smaller the value of $w^2/t$, the less the luminance unevenness in plan view of display device 100 and therefore the more preferable; however, in this case, w may become smaller than the processing limitation of convex lens surface 153, and t may be excessively increased. In view of this, it is more preferable that $w^2/t$ is equal to or greater than 0.0001.

On the other hand, when w increases, or t decreases such that $w^2/t$ is greater than 0.85, overlapping of the light beams emitted from third light flux controlling member 116 on diffusion member 140 is reduced. Consequently, luminance unevenness is caused in plan view of display device 100. Note that, FIG. 10B illustrates a case where w has a large value.

Figure 11A:
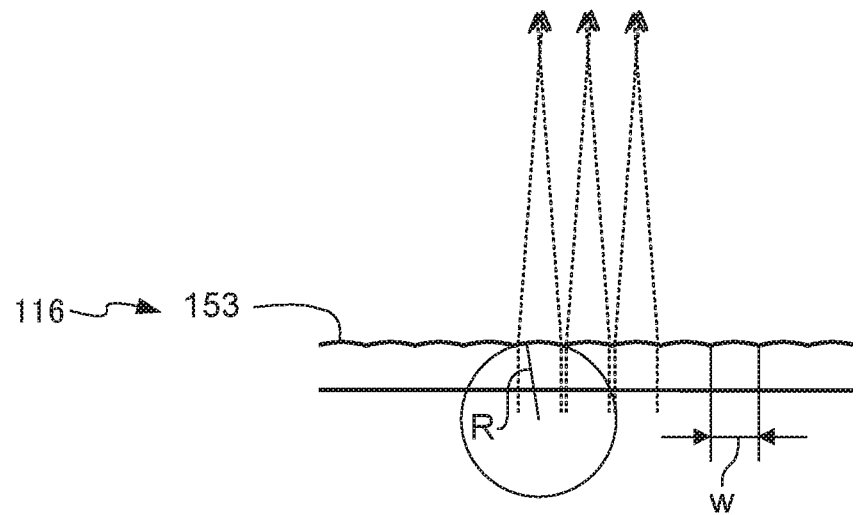
FIGS. 11A and 11B are drawings for describing Expression (3)
Figure 11B:
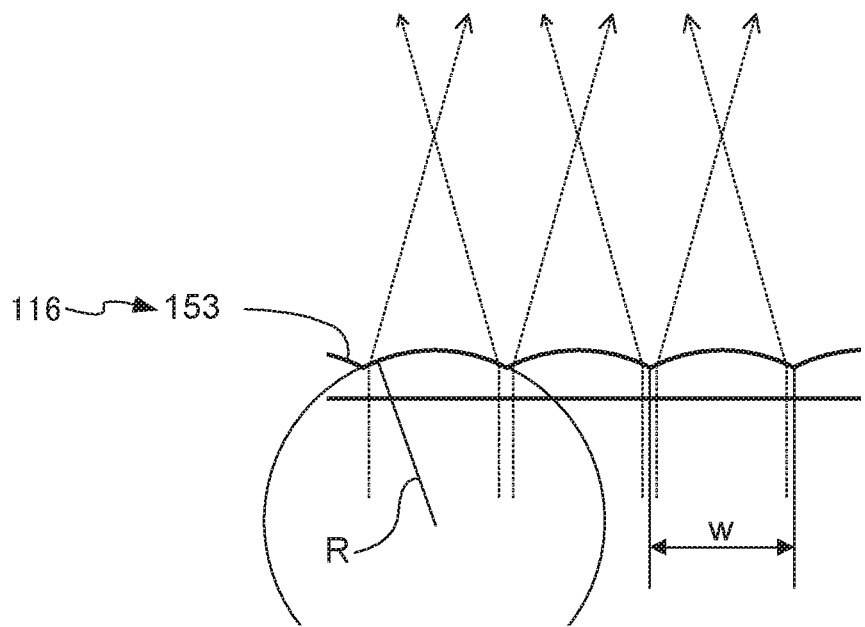

FIG. 11A illustrates a relationship between curvature radius R of convex lens surface 153 and width w of third light flux controlling member 116 according to the comparative example, and FIG. 11B illustrates a relationship between curvature radius R of convex lens surface 153 and width w of third light flux controlling member 116 according to the comparative example. Note that, hatching of third light flux controlling member 116 and diffusion member 140 is omitted in FIGS. 11A and 11B to illustrate light paths.

When w decreases, or R increases such that w/R becomes equal to or smaller than 0.4, the light refraction power decreases, and the quantity of light emitted oblique to optical axis OA decreases. Consequently, end portions are darkened when display device 100 is viewed in an oblique direction, thus causing luminance unevenness. Note that, FIG. 11A illustrates a case where w has a small value.

On the other hand, when w increases, or R decreases such that w/R becomes equal to or greater than 1.4, the light refraction power increases, and the angle of the light emitted from third light flux controlling member 116 to optical axis OA excessively increases. Consequently, the light quantity required for display device 100 cannot be ensured although the luminance unevenness of display device 100 as viewed in an oblique direction is improved.

In addition, although not illustrated in the drawings, when w/R is greater than 0.4 and smaller than 1.4, the light quantity required for display device 100 can be ensured without causing luminance unevenness.

Effect

As described above, in display device 100 including the surface light source device according to Embodiment 1, $-0.6<d/f<0$ is satisfied by focus distance f of first light flux controlling member 114, and distance d between first central axis CA1 of first light flux controlling member 114 and optical axis OA of light-emitting element 112 which is the most remote light-emitting element from first central axis CA1 of first light flux controlling member 114. In addition, in the cross section including third central axis CA3, width w of convex lens surface 153 or concave lens surface 155, curvature radius R of convex lens surface 153 or concave lens surface 155, and distance t between diffusion member 140 and the intersection of the center line of convex lens surface 153 or concave lens surface 155 and the surface of third light flux controlling member 116 on diffusion member 140 side satisfy $0<w^2/t<0.85$ and $0.4<w/R<1.4$. As shown in the Example described later, by setting d/f, $w^2/t$ and w/R to values falling within a predetermined range, display member 120 can be uniformly illuminated even when a plurality of light-emitting elements 112 are used.

In addition, since second light flux controlling member 115 includes refractive fresnel lens part 145, mounting errors can be absorbed when display device 100 is mounted.

Preferable Modification 1

Next, a condition for preventing luminance unevenness in display device 100 according to Embodiment 1 is described. As described above, light-emitting element 112 and light flux controlling member 113 are disposed in display device 100 so as to satisfy Expressions (1) to (3).

$$-0.6<d/f<0 \quad (1)$$

$$0<w^2/t<0.85 \quad (2)$$

$$0.4<w/R<1.4 \quad (3)$$

When display device 100 is configured to satisfy Expressions (4) to (6) as well as Expressions (1) to (3), luminance unevenness can be further suppressed.

Figure 12:
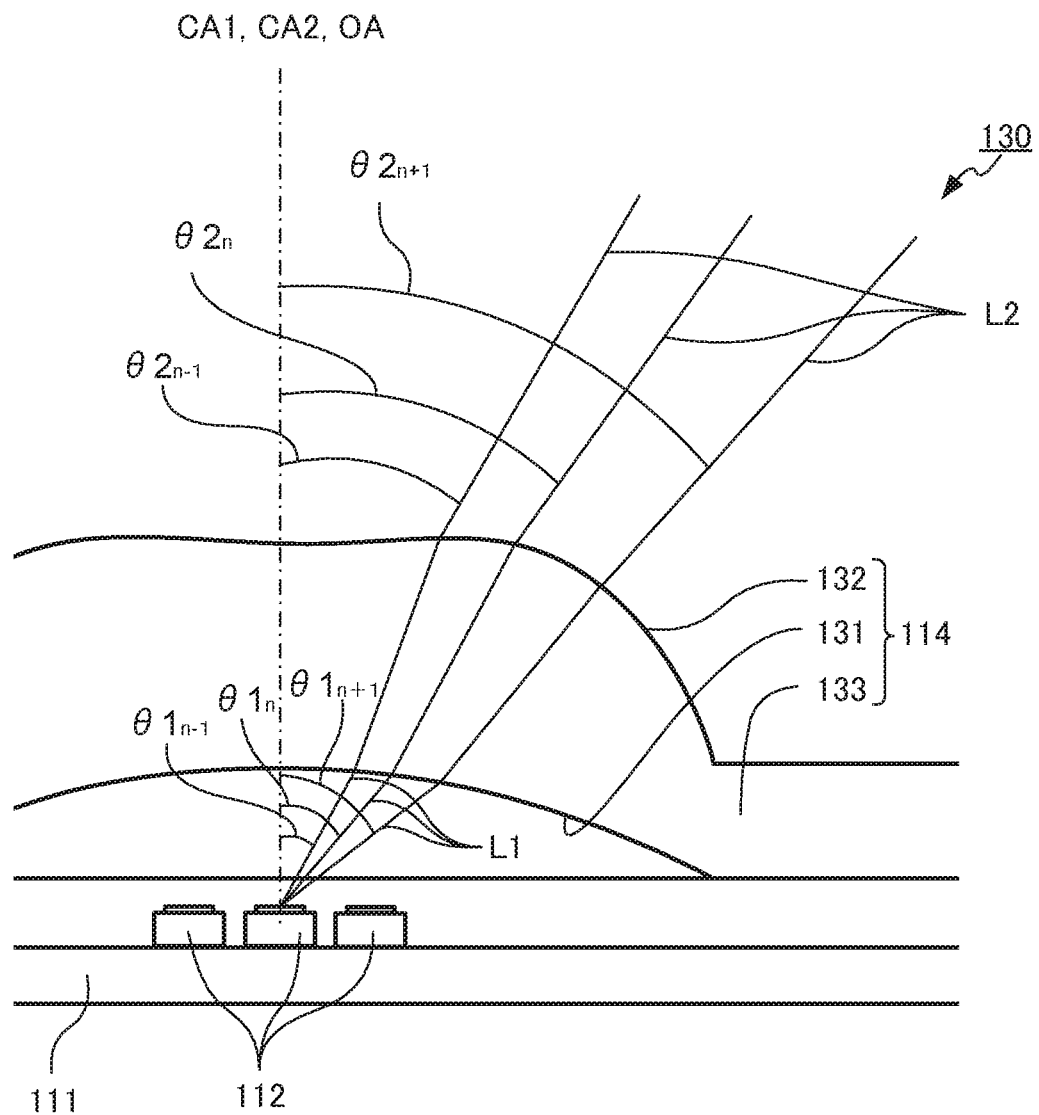
FIG. 12 is a drawing for describing Expression (4) and Expression (5)
Figure 13:
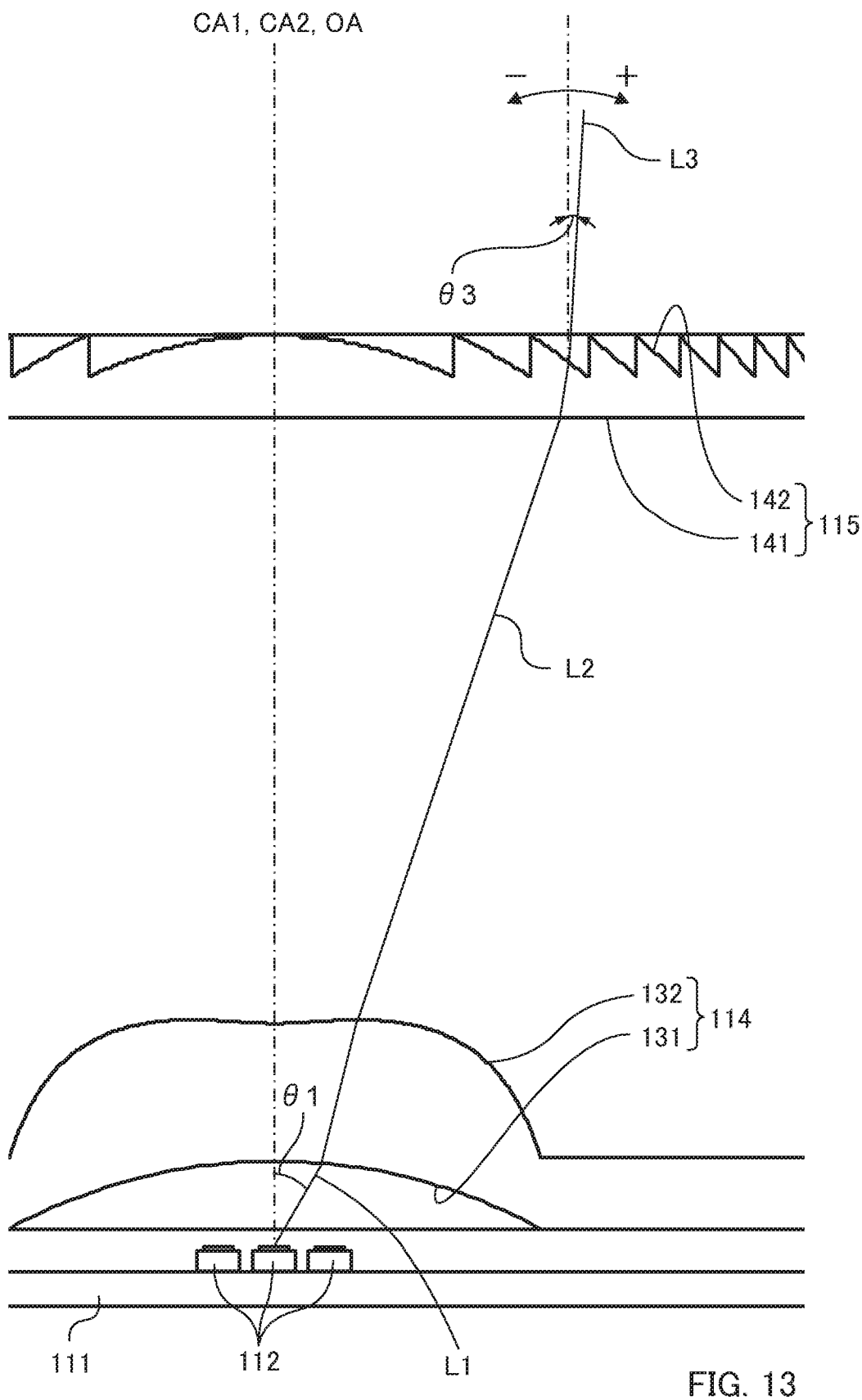
FIG. 13 is a drawing for describing Expression (6)

FIG. 12 is a drawing for describing Expression (4) and Expression (5). FIG. 13 is a drawing for describing Expression (6). Note that, hatching of substrate 111, light-emitting element 112 and first light flux controlling member 114 is omitted in FIG. 12 to illustrate light paths. In addition, hatching of substrate 111, light-emitting element 112, first light flux controlling member 114 and second light flux controlling member 115 is omitted in FIG. 13 to illustrate light paths.

As illustrated in FIG. 12, light-emitting device 130 (display device 100) further satisfies Expression (4) in the case where $\theta 1_n$ represents an emission angle of first light beam L1 emitted from the light emission center of light-emitting element 112 disposed such that optical axis OA coincides with first central axis CA1, and $\theta 2_n$ represents an angle, to first central axis CA1, of second light beam L2 that is generated when first light beam L1 having been controlled by first light flux controlling member 114 is emitted from first light flux controlling member 114. In addition, n represents an arbitrary number of a light beam in a cross section including first central axis CA and second central axis CA2.

[Expression 1]

$$\frac{\Delta(\theta 2_{n+1} - \theta 2_n)}{\Delta(\theta 1_{n+1} - \theta 1_n)} > 0 \quad (4)$$

In Expression (4), it is assumed that $0°<\theta 1_n<\theta 1_{n+1}<60°$, and $\theta 2_n$ is an angle of a light beam corresponding to $\theta 1_n$.

As described above, display device 100 is configured such that $\theta 2_n$ increases as $\theta 1_n$ increases. With this configuration, second light beams L2 that are generated when emitted from first emission surface 132 of first light flux controlling member 114 do not overlap each other, and thus continuous light can be entered into second light flux controlling member 115.

Display device 100 further satisfies Expression (5).

[Expression 2]

$$\frac{\Delta(\theta 2_n - \theta 2_{n-1})}{\Delta(\theta 1_n - \theta 1_{n-1})} \geqq \frac{\Delta(\theta 2_{n+1} - \theta 2_n)}{\Delta(\theta 1_{n+1} - \theta 1_n)} \quad (5)$$

In Expression (5), it is assumed that $0° < \theta 1_{n-1} < \theta 1_n < \theta 1_{n+1} < 60°$.

In this manner, light-emitting device 130 (display device 100) has a configuration in which the ratio of the increase in $\theta 2n$ to the increase in $\theta 1n$ decreases along with the increase in $\theta 1n$. This means that, when the center portion is located on first central axis CA1 side and the peripheral portion is located on first flange 133 side, the light beam density of second light beam L2 emitted from the peripheral portion of first emission surface 132 is higher than that of second light beam L2 emitted from the center portion of first emission surface 132. With this configuration, the light beam density at the center portion where the light beam having a high intensity arrives is low, and the light beam density at the peripheral portion where the light beam having a low intensity arrives is high. Accordingly, the illuminance at second incidence surface 141 of second light flux controlling member 115 is uniformized Light-emitting element 112 coinciding with first central axis CA1 is provided in the present embodiment;

however, in the case where no light-emitting element coinciding with first central axis CA1 is provided, first light flux controlling member 114 is designed to satisfy Expressions (4) and (5) by setting optical axis OA as a total light flux axis that is a center of a stereoscopic total light flux of all of a plurality of light-emitting elements 112 mounted on the same substrate 111 surface, and by setting a virtual emission point as an intersection of optical axis OA and an extension of the light-emitting surfaces of light-emitting elements 112 mounted on the same substrate 111, so as to set $\theta 1_n$ as an emission angle of first light beam L1 emitted from the virtual emission point.

As illustrated in FIG. 13, when $\theta 3$ represents the angle to first central axis CA1 of third light beam L3, which is generated when second light beam L2 controlled by second light flux controlling member 115 is emitted from second emission surface 142 of second light flux controlling member 115, it is preferable that light-emitting device 130 (display device 100) satisfy the following Expression (6).

$$-6° < \theta 3 < 10° \quad (6)$$

In Expression (6), $0° < \theta 1 < 40°$, and $\theta 3$ represents an angle, to first central axis CA, of third light beam L3 emitted from second light flux controlling member 115. Here, $\theta 3$ is set as follows: with respect to 0° set as the angle of light L0 which advances in parallel with first central axis CA1, the angle, to first central axis CA1, of third light beam L3 that approaches first central axis CA1 has a negative "−" value, and the angle, to first central axis CA1, of third light beam L3 that advances away from first central axis CA1 has a positive "+" value.

In this manner, third light beam L3, which is generated when the light is emitted from second light flux controlling member 115, is emitted in a direction approximately parallel to first central axis CAE Note that when $\theta 3$ is 10° or greater, the degree of scattering is significant, and third light beam L3 significantly advances away from first central axis CAE With this configuration, first central axis CA1 side (center portion) is darkened. On the other hand, when $\theta 3$ is smaller than −6°, the degree of condensing is significant, and third light beam L3 approaches first central axis CAE Consequently, the regions (peripheral portions) distanced from first central axis CA1 are darkened.

Display device 100 further satisfies Expression (4) to Expression (6) as described above, and thus can suppress luminance unevenness.

Preferable Modification 2

Next, other conditions for further suppressing luminance unevenness in display device 100 according to Embodiment 1 are described. As described above, in display device 100, light-emitting element 112 and light flux controlling member 113 are disposed so as to satisfy Expressions (1) to (3).

$$-0.6 < d/f < 0 \quad (1)$$

$$0 < w^2/t < 0.85 \quad (2)$$

$$0.4 < w/R < 1.4 \quad (3)$$

Display device 100 is configured to further satisfy Expressions (7) and (8) in addition to Expressions (1) to (3), and thus can further suppress luminance unevenness.

$$-15 < w \times bfl/t < 3 \quad (7)$$

$$0.2 < |w/bfl| < 1.0 \quad (8)$$

Here, it is assumed that bfl is a distance between a predetermined point in third light flux controlling member 116 and the focal point of the optical surface of third light flux controlling member 116, and bfl has a positive value when the focal point is located on diffusion member 140 side with respect to the predetermined point, and has a negative value when the focal point is located on second light flux controlling member 115 side with respect to the predetermined point. Accordingly, bfl has a positive value when third light flux controlling member 116 includes convex lens surface 153, and bfl has a negative value when third light flux controlling member 116 includes concave lens surface 155. When third light flux controlling member 116 has convex lens surface 153, bfl is a length (positive value) between the focal point of convex lens surface 153 and the intersection of the center line of convex lens surface 153 and the surface of third light flux controlling member 116 on diffusion member 140 side. In addition, when third light flux controlling member 116 includes concave lens surface 155, bfl is a length (negative value) between the focal point of concave lens surface 155 and the intersection of the center line of concave lens surface 155 and the surface of third light flux controlling member 116 on diffusion member 140 side.

With reference to FIG. 14, a relationship between third light flux controlling member 116 and diffusion member 140 in the present modification is described. First, bfl in Expression (7) and Expression (8) is described. FIG. 14A is a drawing for describing bfl of a case where convex lens surface 153 is disposed in third emission surface 152, FIG. 14B is a drawing for describing bfl of a case where concave lens surface 155 is disposed in third emission surface 152, FIG. 14C is a drawing for describing bfl of a case where convex lens surface 153 is disposed in third incidence surface 151, and FIG. 14D is a drawing for describing bfl of a case where concave lens surface 155 is disposed in third incidence surface 151. Note that only one convex lens surface 153 or one concave lens surface 155 is illustrated in FIGS. 14A to 14D.

Figure 14A:
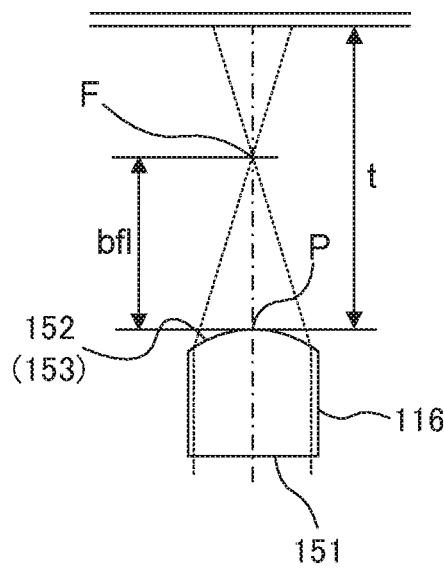
FIGS. 14A to 14D are drawings for describing bfl.

As illustrated in FIG. 14A, bfl has a positive value in the case where convex lens surface 153 is disposed in third emission surface 152. In this case, P represents the intersection of the center line of convex lens surface 153 and the surface of third light flux controlling member 116 on diffusion member 140 side. In the present embodiment, intersection P and the middle point of convex lens surface 153 are identical to each other. Bfl is a length between the intersection P and focal point F of convex lens surface 153.

Figure 14C:
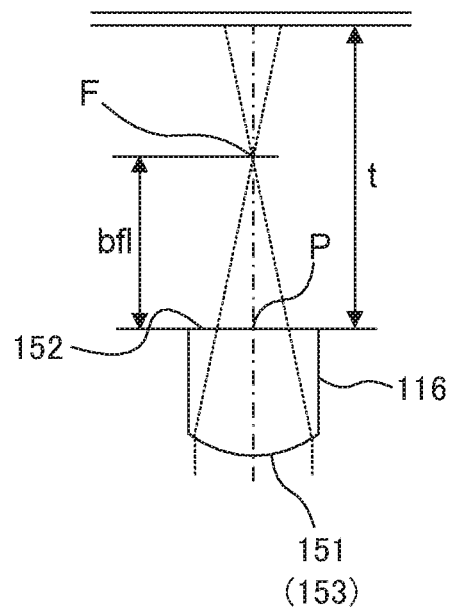
Figure 14B:
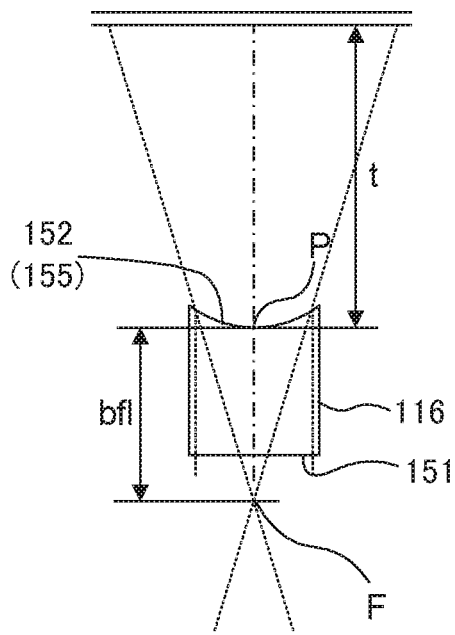

As illustrated in FIG. 14B, in the case where concave lens surface 155 is disposed in third emission surface 152, bfl has a negative value. In this case, P is the intersection of the center line of concave lens surface 155 and the surface of third light flux controlling member 116 on diffusion member 140 side. In the present embodiment, intersection P and the middle point of concave lens surface 155 are identical to each other. Bfl is a length between the intersection P and focal point F of concave lens surface 155.

As illustrated in FIG. 14C, in the case where convex lens surface 153 is disposed in third incidence surface 151, bfl has a positive value. In this case, P is the intersection of the center line of convex lens surface 153 and the surface of third light flux controlling member 116 on diffusion member 140 side. In the present embodiment, intersection P and the middle point of concave lens surface 155 are identical to each other. Bfl is a length between the intersection P and focal point F of convex lens surface 153.

Figure 14D:
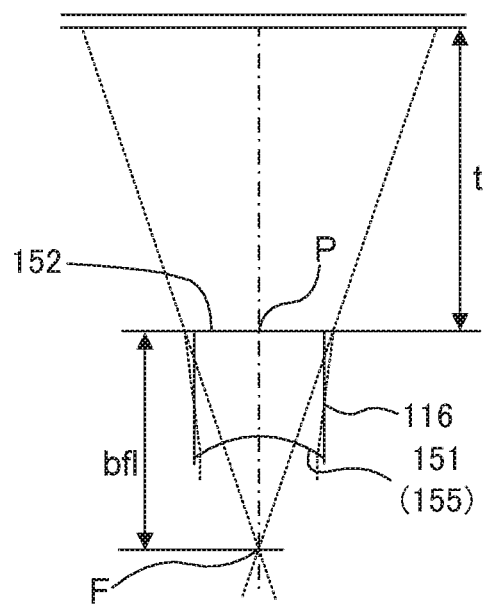

As illustrated in FIG. 14D, in the case where concave lens surface 155 is disposed in third incidence surface 151, bfl has a negative value. In this case, P is the intersection of the center line of concave lens surface 155 and the surface of third light flux controlling member 116 on diffusion member 140 side. In the present embodiment, intersection P and the middle point of concave lens surface 155 are identical to each other. Bfl is a length between the intersection P and focal point F of concave lens surface 155.

Figure 15A:
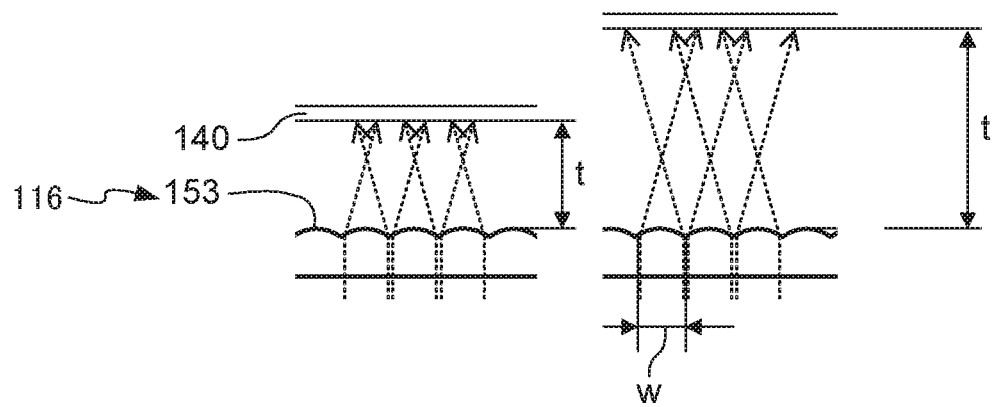
FIGS. 15A to 15C are drawings for describing Expression (7)

Next, Expression (7) is described. Expression (7) defines a condition for a case where diffusion member 140 is viewed from the front side. Light beams emitted from third light flux controlling member 116 overlap each other on diffusion member 140, and thus luminance unevenness can be suppressed. FIG. 15A is a schematic view illustrating an influence, on a light path, of distance t between an apex of convex lens surface 153 and diffusion member 140, FIG. 15B is a schematic view illustrating an influence of bfl on a light path, and FIG. 15C is a schematic view illustrating an influence of width w of convex lens surface 153 in Expression (7).

In a display device in which third light flux controlling member 116 and diffusion member 140 are disposed such that (w×bfl)/t is greater than −15 and smaller than 3, light beams emitted from third light flux controlling member 116 overlap each other on diffusion member 140, and thus luminance unevenness can be suppressed. When w or bfl increases, or when t decreases, such that (w×bfl)/t becomes 3 or greater, light beams emitted from third light flux controlling member 116 do not overlap, and consequently luminance unevenness may be caused. On the other hand, from a view point of the limitation of processing, it is difficult to set (w×bfl)/t to −15 or smaller.

When w and bfl are constant as illustrated in FIG. 15A, the degree of overlapping of light beams emitted from third light flux controlling member 116 increases as t increases, and thus luminance unevenness can be suppressed. Note that the greater the value of t, the more preferable. It should be noted that, an excessively large t value is not preferable since such an excessively large t value results in an increase in size of the surface light source device.

Figure 15B:
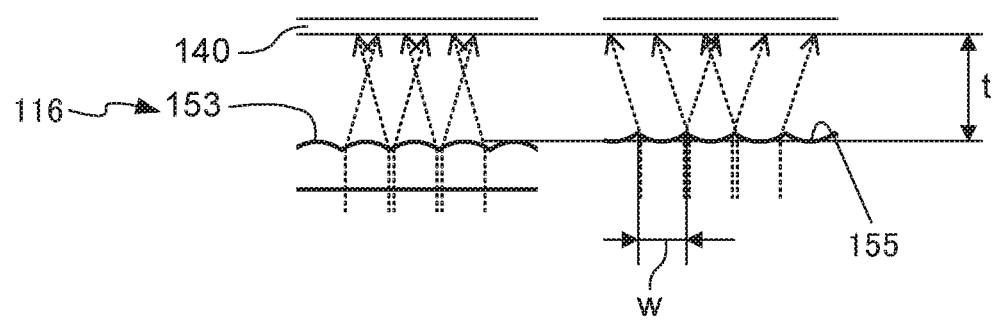
Figure 15C:
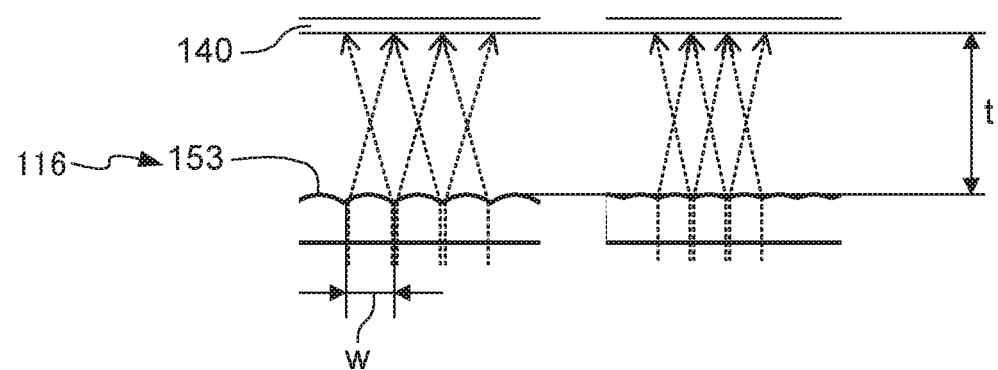

As illustrated in FIG. 15B, when w and t are constant, the smaller bfl, the more light beams emitted from third light flux controlling member 116 overlap each other, and thus luminance unevenness can be suppressed. Note that, when bfl has a positive value, the degree of light scattering increases as the value of bfl decreases, and thus luminance unevenness can be suppressed. On the other hand, when bfl has a negative value, the degree of overlapping of light is reduced by an excessively small bfl, and light becomes approximately parallel to the optical axis, and consequently, luminance unevenness may be caused.

As illustrated in FIG. 15C, when bfl and t are constant, the degree of overlapping of light beams emitted from third light flux controlling member 116 increases as w decreases, and thus luminance unevenness can be suppressed.

Accordingly, it is preferable to dispose light flux controlling member 116 and diffusion member 140 such that Expression (7) is satisfied from the viewpoint of preventing luminance unevenness when diffusion member 140 is viewed from the front side.

Figure 16A:
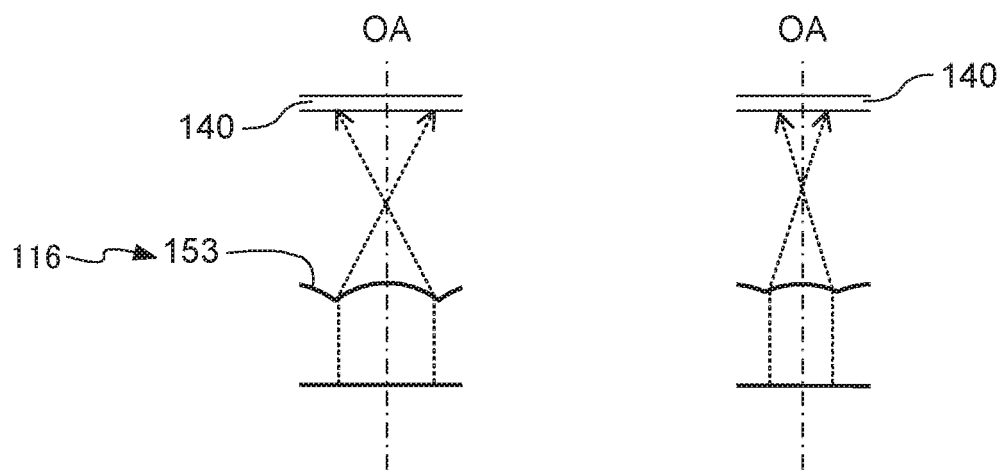
FIGS. 16A and 16B are drawings for describing Expression (8)

Next, Expression (8) is described. Expression (8) defines a condition for a case where diffusion member 140 is viewed in an oblique direction. When diffusion member 140 is viewed in an oblique direction, it is preferable that the light emitted from third light flux controlling member 116 have a predetermined angle with respect to the optical axis of convex lens surface 153. FIG. 16A is a schematic view illustrating an influence of w on light paths with regard to Expression (8), and FIG. 16B is a schematic view illustrating an influence of bfl on light paths with regard to Expression (8).

In a display device in which third light flux controlling member 116 and diffusion member 140 are disposed such that |w/bfl| is greater than 0.2 and smaller than 1.0, light beams emitted from third light flux controlling member 116 overlap each other on diffusion member 140, and thus luminance unevenness can be suppressed. When w decreases, or the absolute value of bfl increases, such that |w/bfl| becomes 0.2 or smaller, the light refraction force is excessively weakened and the quantity of light that is emitted oblique to optical axis OA is reduced, and consequently end portions may be darkened, causing luminance unevenness. On the other hand, when w increases, or the absolute value of bfl decreases, such that |w/bfl| becomes 1.0 or greater, the light refraction force becomes excessively strong. As a result, luminance unevenness in the case where diffusion member 140 is viewed in an oblique direction is suppressed since the quantity of light emitted oblique to optical axis OA increases; however, required luminance may not be ensured due to excessive light expansion.

As illustrated in FIG. 16A, when bfl is constant, the quantity of light that is emitted oblique to optical axis OA increases as w increases, and the luminance unevenness as viewed in a direction oblique to optical axis OA can be suppressed.

Figure 16B:
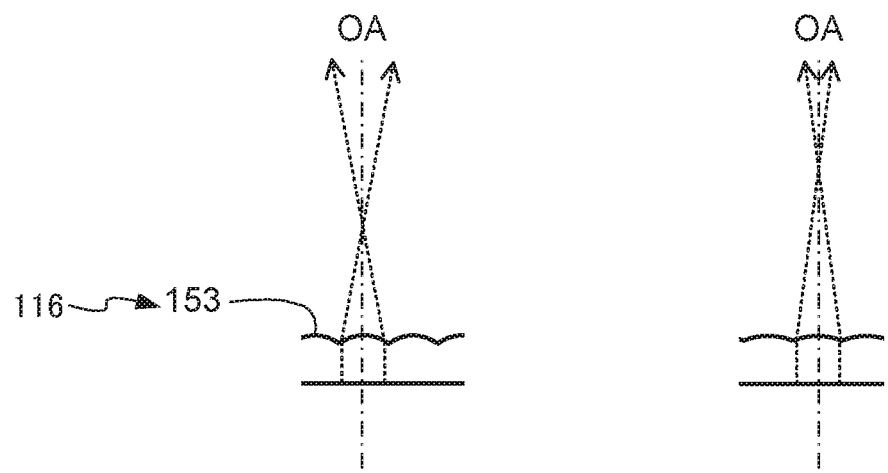

As illustrated in FIG. 16B, when w is constant, the smaller the absolute value of bfl, the greater the quantity of light that is emitted oblique to optical axis OA, and thus, luminance unevenness as viewed in a direction oblique to optical axis OA can be suppressed.

Accordingly, it is preferable to dispose third light flux controlling member 116 and diffusion member 140 such that Expression (8) is satisfied from the viewpoint of preventing luminance unevenness when diffusion member 140 is obliquely viewed.

Embodiment 2

A display device according to Embodiment 2 is different from display device 100 according to Embodiment 1 only in the configuration of third light flux controlling member 216. In view of this, in Embodiment 2, only the configuration of third light flux controlling member 216 is described.

Configuration of Third Light Flux Controlling Member

Figure 17A:
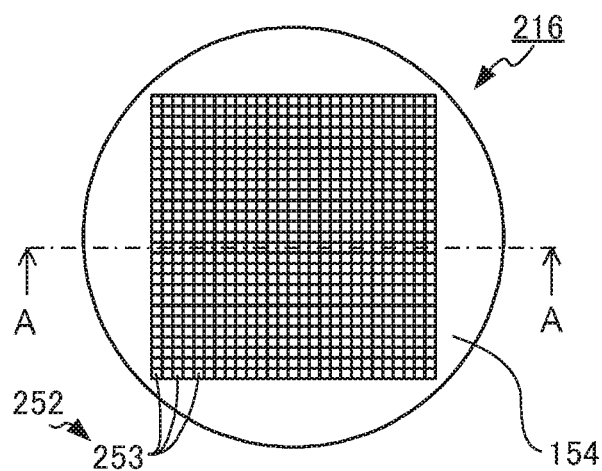
FIGS. 17A to 17D illustrate a configuration of a third light flux controlling member according to Embodiment 2.
Figure 17C:
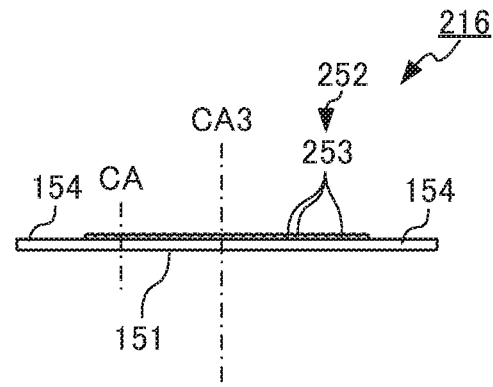
Figure 17B:
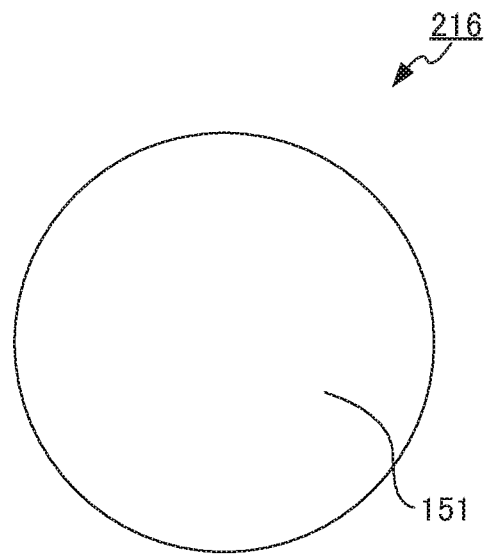
Figure 17D:
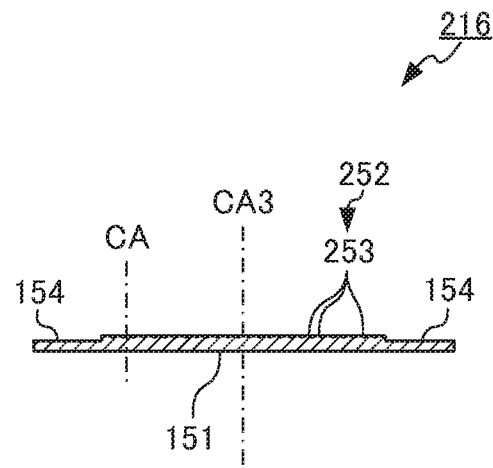

FIGS. 17A to 17D illustrate a configuration of third light flux controlling member 216. FIG. 17A is a plan view of third light flux controlling member 216, FIG. 17B is a bottom view of third light flux controlling member 216, FIG. 17C is a side view of third light flux controlling member 216, and FIG. 17D is a sectional view taken along line A-A of FIG. 17A.

As illustrated in FIGS. 17A to 17D, third light flux controlling member 216 includes third incidence surface 151 and third emission surface 252. Third emission surface 252 includes a plurality of convex lens surfaces 253.

The plurality of convex lens surfaces 253 are arranged along a first direction and a second direction perpendicular to the first direction. In the present embodiment, each convex lens surface 253 has a square shape in plan view, and the plurality of convex lens surfaces 253 have the same shape. In addition, convex lens surface 253 has a curvature in any cross section including central axis CA of convex lens surface 253. The shape of convex lens surface 253 in the cross section including the central axis CA may be an arc shape, a curve whose curvature radius increases in a direction away from the apex, or a curve including an arc at a portion intersecting central axis CA in which the curvature radius increases in a direction away from the arc.

As described above, a display device according to Embodiment 2 can achieve a wide viewing angle in the first direction and the second direction in which convex lenses 253 are arranged, while achieving an effect similar to that of display device 100 according to Embodiment 1.

In addition, although not illustrated in the drawings, third light flux controlling member 216 may include third emission surface 252 including a plurality of concave lens surfaces. In this case, a plurality of concave lens surfaces are arranged in the first direction and the second direction. Further, third light flux controlling member 216 may include third incidence surface 251 including a plurality of convex lens surfaces 253 or a plurality of concave lens surfaces.

Figure 18A:
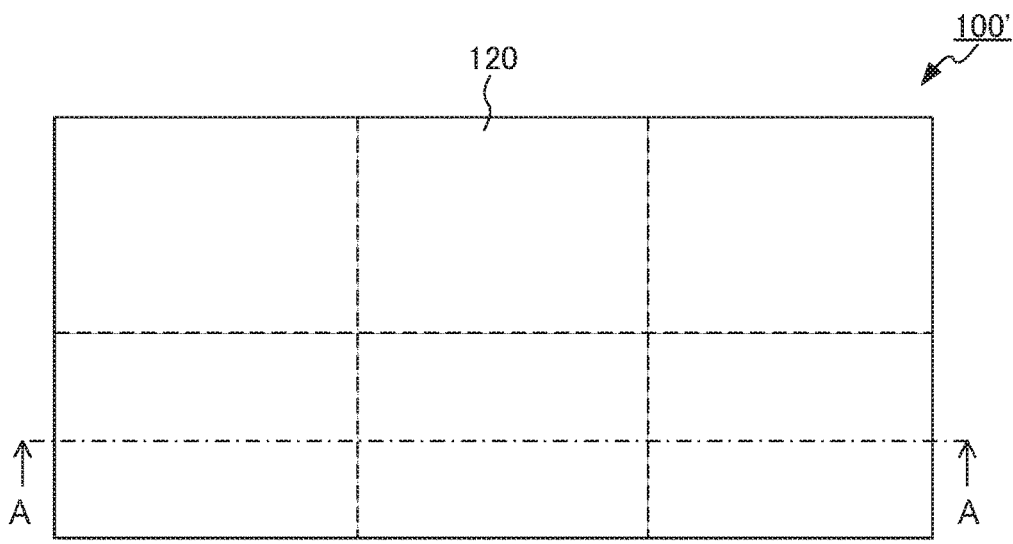
FIGS. 18A and 18B illustrate a configuration of a display device according to Embodiment 2.
Figure 18B:
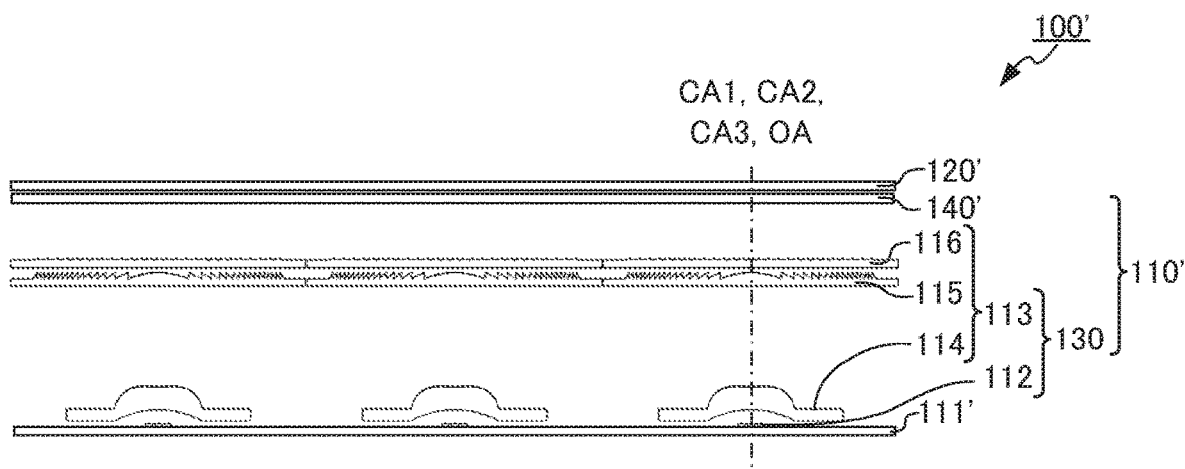

Note that display device 100' may include a plurality of light-emitting devices 130. FIGS. 18A and 18B illustrate a configuration of display device 100' according to a modification. FIG. 18A is a plan view of display device 100', and FIG. 18B is a sectional view taken along line A-A of FIG. 18A.

As illustrated in FIGS. 18A and 18B, display device 100' includes substrate 111', a plurality of light-emitting devices 130, diffusion member 140', (surface light source device 110'), and display member 120'. In display device 100', a plurality of light-emitting devices 130 are disposed on one substrate 111'. Note that, in the present embodiment, six light-emitting devices 130 are disposed in a matrix in one substrate 111'.

Light emitted from the plurality of light-emitting devices 130 reaches diffusion member 140' and display member 120'. In the present embodiment, each of diffusion member 140' and display member 120' has the same size as that of substrate 111' for example so that light emitted from six light-emitting devices 130 reaches diffusion member 140' and display member 120'.

With the above-mentioned configuration, the surface light source device and the display device can be upsized. Note that, instead of providing a plurality of light-emitting devices 130 in one diffusion member 140' and display member 120', the display device may be upsized by disposing a plurality of display devices 100, each of which includes one light-emitting device 130, diffusion member 140' and display member 120' in the plane direction.

Hereinafter, the present invention is described in detail with reference to Examples, but the present invention is not limited to Examples.

EXAMPLES

Example 1

Example 1 examined relationships of width w of convex lens surface 153 in the cross section including third central axis CA3, distance t between diffusion member 140 and the intersection of the center line of convex lens surface 153 and the surface of third light flux controlling member 116 on diffusion member 140 side, curvature radius R of convex lens surface 153, and uniformity U0 and U5/U0 in display device 100 according to Embodiment 1.

Configuration of Display Device

Figure 19:
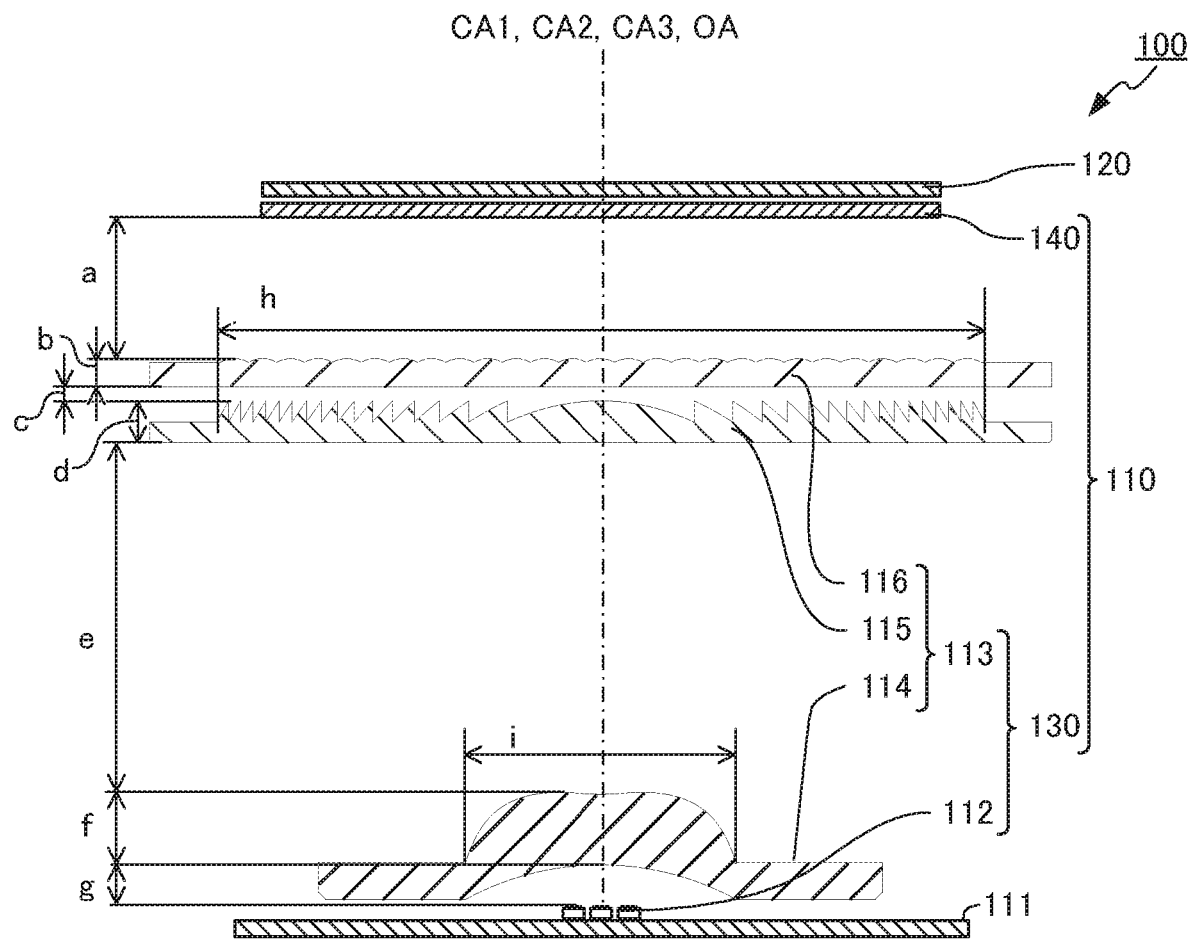
FIG. 19 is a schematic view illustrating a configuration of a display device used in an example.

FIG. 19 is a schematic view illustrating a configuration of display device 100 used in the Example. As illustrated in FIG. 19, display device 100 includes surface light source device 110 and display member 120. Surface light source device 110 includes light-emitting element 112 and light flux controlling member 113. Light flux controlling member 113 includes first light flux controlling member 114, second light flux controlling member 115 and third light flux controlling member 116. Note that, in FIG. 19, a=10 mm, b=3 mm, c=1 mm, d=3 mm, e=25 mm, f=5 mm, g=3 mm, h=55.5 mm, and i=16.2 mm, indicating dimensions in a display device of No. 17 described later. Note that, focal length f of the first light flux controlling member in Example is 1 mm, and distance d between the first central axis and the optical axis of the light-emitting element remotest from the first central axis is −28.14 mm. That is, in Example, d/f is −0.036.

The uniformity in the display region of each display device was obtained through the simulation. The uniformity in display region 121 was calculated by Expression (9).

$$\text{Uniformity} = \text{Minimum luminance}/\text{Maximum luminance} \quad (9)$$

The "minimum luminance" is a minimum value of the luminance in the display region, and the "maximum luminance" is a maximum value of the luminance in the display region.

Table 1 shows parameters of display devices of 36 types used for simulation of uniformity.

In Table 1, w is the width of the convex lens surface in the cross section including the third central axis, t is a distance between the diffusion member and an intersection of the center line of the convex lens surface and the surface of the third light flux controlling member on the diffusion member side, R is a curvature radius of the convex lens surface, n is a refractive index, U0 is a uniformity in the display region as viewed from the front side, and U5 is a uniformity of the display region as viewed at an angle of 5°. Although not indicated, the display devices No. 1 to 36 satisfy Expression (1).

TABLE 1

| Display Device No. | w | t | R | n | w/R | w²/t | U0 | U5 | U5/U0 |
|---|---|---|---|---|---|---|---|---|---|
| 1 | 1 | 5 | 1 | 1.49 | 1.00 | 0.2 | 0.91 | 0.87 | 0.96 |
| 2 | 1 | 5 | 1.5 | 1.49 | 0.67 | 0.2 | 0.94 | 0.76 | 0.81 |
| 3 | 1 | 5 | 2 | 1.49 | 0.50 | 0.2 | 0.90 | 0.68 | 0.75 |
| 4 | 1 | 5 | 3 | 1.49 | 0.33 | 0.2 | 0.87 | 0.59 | 0.68 |
| 5 | 1 | 10 | 1 | 1.49 | 1.00 | 0.1 | 0.90 | 0.84 | 0.93 |
| 6 | 1 | 10 | 1.5 | 1.49 | 0.67 | 0.1 | 0.94 | 0.76 | 0.81 |
| 7 | 1 | 10 | 2 | 1.49 | 0.50 | 0.1 | 0.92 | 0.66 | 0.72 |
| 8 | 1 | 10 | 3 | 1.49 | 0.33 | 0.1 | 0.88 | 0.57 | 0.65 |
| 9 | 1 | 20 | 1 | 1.49 | 1.00 | 0.05 | 0.89 | 0.84 | 0.94 |
| 10 | 1 | 20 | 1.5 | 1.49 | 0.67 | 0.05 | 0.94 | 0.77 | 0.82 |
| 11 | 1 | 20 | 2 | 1.49 | 0.50 | 0.05 | 0.92 | 0.66 | 0.72 |
| 12 | 1 | 20 | 3 | 1.49 | 0.33 | 0.05 | 0.87 | 0.56 | 0.65 |
| 13 | 2 | 5 | 2 | 1.49 | 1.00 | 0.8 | 0.78 | 0.73 | 0.93 |
| 14 | 2 | 5 | 3 | 1.49 | 0.67 | 0.8 | 0.81 | 0.66 | 0.81 |
| 15 | 2 | 5 | 4 | 1.49 | 0.50 | 0.8 | 0.83 | 0.60 | 0.72 |
| 16 | 2 | 5 | 6 | 1.49 | 0.33 | 0.8 | 0.84 | 0.54 | 0.64 |
| 17 | 2 | 10 | 2 | 1.49 | 1.00 | 0.4 | 0.88 | 0.83 | 0.94 |
| 18 | 2 | 10 | 3 | 1.49 | 0.67 | 0.4 | 0.85 | 0.71 | 0.83 |
| 19 | 2 | 10 | 4 | 1.49 | 0.50 | 0.4 | 0.81 | 0.59 | 0.73 |
| 20 | 2 | 10 | 6 | 1.49 | 0.33 | 0.4 | 0.80 | 0.53 | 0.66 |
| 21 | 2 | 20 | 2 | 1.49 | 1.00 | 0.2 | 0.92 | 0.89 | 0.96 |
| 22 | 2 | 20 | 3 | 1.49 | 0.67 | 0.2 | 0.95 | 0.77 | 0.81 |
| 23 | 2 | 20 | 4 | 1.49 | 0.50 | 0.2 | 0.91 | 0.67 | 0.73 |
| 24 | 2 | 20 | 6 | 1.49 | 0.33 | 0.2 | 0.80 | 0.52 | 0.65 |
| 25 | 3 | 5 | 3 | 1.49 | 1.00 | 1.8 | 0.46 | 0.43 | 0.94 |
| 26 | 3 | 5 | 4.5 | 1.49 | 0.67 | 1.8 | 0.51 | 0.43 | 0.84 |
| 27 | 3 | 5 | 6 | 1.49 | 0.50 | 1.8 | 0.56 | 0.43 | 0.76 |
| 28 | 3 | 5 | 9 | 1.49 | 0.33 | 1.8 | 0.63 | 0.43 | 0.68 |
| 29 | 3 | 10 | 3 | 1.49 | 1.00 | 0.9 | 0.53 | 0.50 | 0.93 |
| 30 | 3 | 10 | 4.5 | 1.49 | 0.67 | 0.9 | 0.47 | 0.38 | 0.81 |
| 31 | 3 | 10 | 6 | 1.49 | 0.50 | 0.9 | 0.48 | 0.37 | 0.78 |
| 32 | 3 | 10 | 9 | 1.49 | 0.33 | 0.9 | 0.56 | 0.37 | 0.66 |
| 33 | 3 | 20 | 3 | 1.49 | 1.00 | 0.45 | 0.88 | 0.85 | 0.97 |
| 34 | 3 | 20 | 4.5 | 1.49 | 0.67 | 0.45 | 0.84 | 0.70 | 0.83 |
| 35 | 3 | 20 | 6 | 1.49 | 0.50 | 0.45 | 0.71 | 0.53 | 0.75 |
| 36 | 3 | 20 | 9 | 1.49 | 0.33 | 0.45 | 0.47 | 0.35 | 0.76 |

Figure 20:
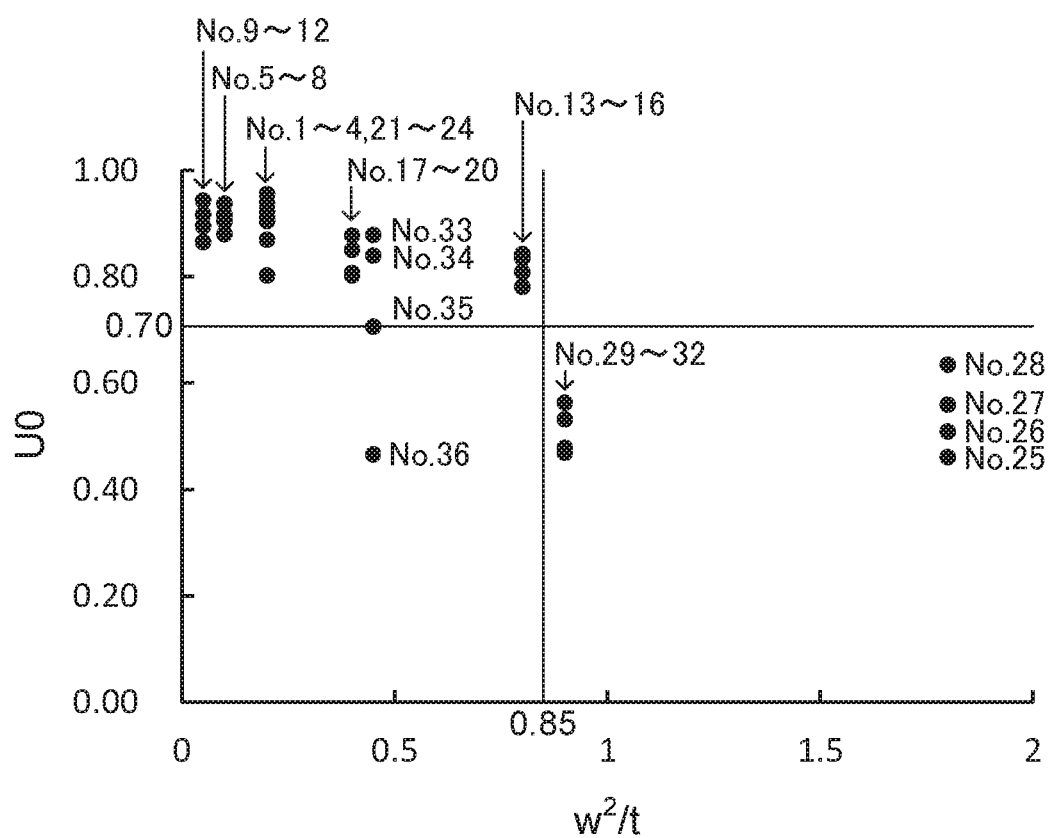
FIG. 20 is a graph illustrating a relationship between uniformity U0 and $w^2/t$ in a display device.

FIG. 20 shows a relationship between uniformity U0 and "(width w of the convex lens surface in the cross section including the third central axis)²/distance t between the apex of the convex lens surface and diffusion member 140" in each display device. FIG. 20 is a plot of results in Table 1. In FIG. 20, the abscissa indicates "(width w of convex lens surface 153 in the cross section including third central axis CA3)²/distance t between the apex of convex lens surface 153 and diffusion member 140", and the ordinate indicates uniformity U0 of the display device in plan view (as viewed from light axis LA).

As illustrated in Table 1 and FIG. 20, to set uniformity U0 that is required for a use in an HUD to 0.7 or greater, w²/t is required to be smaller than 0.85.

Figure 21:
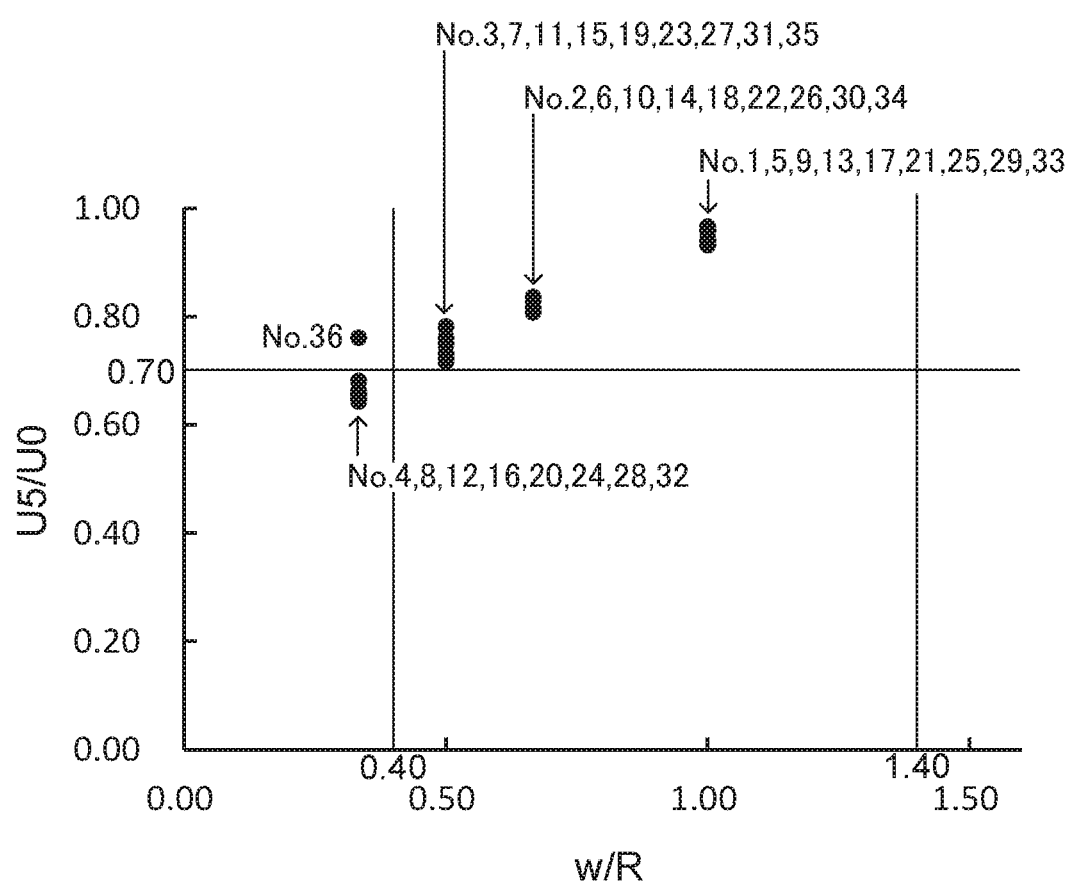
FIG. 21 is a graph illustrating a relationship between uniformity ratio U5/U0 and w/R in a display device.

In addition, as illustrated in Table 1 and FIG. 21, to set uniformity U5/U0 that is required for a use in an HUD to 0.7 or greater, w/R is required to be greater than 0.4 and smaller than 1.4.

It was thus confirmed that, when width w of the convex lens surface in the cross section including the third central axis, and distance t between the diffusion member and the intersection of the center line of the convex lens surface and the surface of the third light flux controlling member on the diffusion member side satisfy 0<w²/t<0.85, and width w of the convex lens surface in the cross section including the third central axis and curvature radius R of convex lens surface satisfy 0.4<w/R<1.4, the display region can be uniformly illuminated with small luminance unevenness. Although results are not presented, similar results were obtained with a display device including the third light flux controlling member including the concave lens surface.

Example 2

Example 2 examined display device 100 including third light flux controlling member 116 in which a plurality of convex lens surfaces 153 or a plurality of concave lens surfaces 155 are disposed in third incidence surface 151, and display device 100 including third light flux controlling member 116 in which a plurality of convex lens surfaces 153 or a plurality of concave lens surfaces 155 are disposed in third emission surface 152.

To be more specific, relationships of width w of the convex lens surface in the cross section including the third central axis, distance t between the apex of the convex lens surface and the diffusion member, length bfl between the focal point of the convex lens surface and the intersection of the center line of the convex lens surface and the surface of the third light flux controlling member on the diffusion member side, uniformity U0, and uniformity ratio U5/U0 were examined in the display device according to Embodiment 1. In addition, in the display device according to Embodiment 1, relationships of width w of the concave lens surface in the cross section including the third central axis, distance t between the bottom of the concave lens surface and the diffusion member, length bfl between the focal point of the concave lens surface and the intersection of the center line of the concave lens surface and the surface of the third light flux controlling member on the diffusion member side, uniformity U0, and uniformity ratio U5/U0 were examined Note that the configuration of the display device is identical to that of Example 1.

Tables 2 to 5 show parameters of display devices of 101 types used for simulation of uniformity.

In Tables 2 to 5, w is a width of the convex lens surface or the concave lens surface in the cross section including the third central axis, bfl is a length between the focal point of the convex lens surface or the concave lens surface and the intersection of the center line of the convex lens surface or the concave lens surface and the surface of the third light flux controlling member on the diffusion member side, t is a distance between the diffusion member and the apex of the convex lens surface or the bottom of the concave lens, U0 is an uniformity in the case where the display region is viewed from the front side, and U5 is an uniformity in the case where the display region is viewed at an angle of 5°. Note that, although not indicated, display devices No. 37 to 83 and 88 to 133 satisfy Expressions (1) to (3).

Tables 2 and 3 show parameters in a display device in which a convex lens surface or a concave lens surface are disposed in third incidence surface, and Tables 4 and 5 show parameters in a display device in which a convex lens surface or a concave lens surface are disposed in the third emission surface. In Tables 2 and 3, the display device whose bfl has a positive value includes a convex lens surface disposed in the third incidence surface, and the display device whose bfl has a negative value includes a concave lens surface disposed on the third incidence surface. In Tables 4 and 5, the display device whose bfl has a positive value includes a convex lens surface disposed on the third emission surface, and the display device whose bfl has a negative value includes a concave lens surface disposed on the third emission surface.

TABLE 2

| Display Device No. | w | t | bfl | (w × bfl)/t | \|w/bfl\| | U0 | U5 | U5/U0 |
|---|---|---|---|---|---|---|---|---|
| 37 | 3 | 10 | −13.25 | −3.98 | 0.23 | 0.89 | 0.65 | 0.73 |
| 38 | 3 | 20 | −13.25 | −1.99 | 0.23 | 0.91 | 0.66 | 0.73 |
| 39 | 3 | 5 | −10.19 | −6.11 | 0.29 | 0.89 | 0.67 | 0.76 |
| 40 | 3 | 10 | −10.19 | −3.06 | 0.29 | 0.95 | 0.76 | 0.80 |
| 41 | 3 | 20 | −10.19 | −1.53 | 0.29 | 0.96 | 0.78 | 0.81 |
| 42 | 2 | 5 | −9.17 | −3.67 | 0.22 | 0.92 | 0.67 | 0.73 |
| 43 | 2 | 10 | −9.17 | −1.83 | 0.22 | 0.93 | 0.67 | 0.72 |
| 44 | 2 | 20 | −9.17 | −0.92 | 0.22 | 0.92 | 0.67 | 0.72 |
| 45 | 3 | 5 | −7.13 | −4.28 | 0.42 | 0.76 | 0.69 | 0.91 |
| 46 | 2 | 5 | −7.13 | −2.85 | 0.28 | 0.94 | 0.76 | 0.81 |
| 47 | 3 | 10 | −7.13 | −2.14 | 0.42 | 0.89 | 0.85 | 0.95 |
| 48 | 2 | 10 | −7.13 | −1.43 | 0.28 | 0.95 | 0.76 | 0.80 |
| 49 | 3 | 20 | −7.13 | −1.07 | 0.42 | 0.93 | 0.89 | 0.96 |
| 50 | 2 | 20 | −7.13 | −0.71 | 0.28 | 0.94 | 0.87 | 0.93 |
| 51 | 2 | 5 | −5.09 | −2.04 | 0.39 | 0.91 | 0.84 | 0.93 |
| 52 | 2 | 10 | −5.09 | −1.02 | 0.39 | 0.91 | 0.86 | 0.95 |
| 53 | 1 | 5 | −4.75 | −0.95 | 0.21 | 0.93 | 0.67 | 0.73 |
| 54 | 2 | 20 | −5.09 | −0.51 | 0.39 | 0.92 | 0.88 | 0.96 |
| 55 | 1 | 10 | −4.75 | −0.48 | 0.21 | 0.92 | 0.67 | 0.73 |
| 56 | 1 | 20 | −4.75 | −0.24 | 0.21 | 0.92 | 0.67 | 0.73 |
| 57 | 1 | 5 | −3.73 | −0.75 | 0.27 | 0.94 | 0.76 | 0.81 |
| 58 | 1 | 10 | −3.73 | −0.37 | 0.27 | 0.94 | 0.77 | 0.82 |
| 59 | 1 | 20 | −3.73 | −0.19 | 0.27 | 0.95 | 0.78 | 0.82 |
| 60 | 1 | 5 | −2.71 | −0.54 | 0.37 | 0.90 | 0.85 | 0.95 |
| 61 | 1 | 10 | −2.71 | −0.27 | 0.37 | 0.90 | 0.86 | 0.95 |
| 62 | 1 | 20 | −2.71 | −0.14 | 0.37 | 0.91 | 0.87 | 0.95 |

TABLE 3

| Display Device No. | w | t | bfl | (w × bfl)/t | \|w/bfl\| | U0 | U5 | U5/U0 |
|---|---|---|---|---|---|---|---|---|
| 63 | 1 | 5 | 1.37 | 0.27 | 0.73 | 0.91 | 0.87 | 0.96 |
| 64 | 1 | 10 | 1.37 | 0.14 | 0.73 | 0.90 | 0.84 | 0.93 |
| 65 | 1 | 20 | 1.37 | 0.07 | 0.73 | 0.89 | 0.84 | 0.94 |
| 66 | 1 | 5 | 2.39 | 0.48 | 0.42 | 0.94 | 0.76 | 0.81 |
| 67 | 1 | 10 | 2.39 | 0.24 | 0.42 | 0.94 | 0.76 | 0.81 |
| 68 | 1 | 20 | 2.39 | 0.12 | 0.42 | 0.94 | 0.77 | 0.82 |
| 69 | 1 | 5 | 3.41 | 0.68 | 0.29 | 0.90 | 0.68 | 0.75 |
| 70 | 1 | 10 | 3.41 | 0.34 | 0.29 | 0.92 | 0.66 | 0.72 |
| 71 | 1 | 20 | 3.41 | 0.17 | 0.29 | 0.92 | 0.66 | 0.72 |
| 72 | 2 | 5 | 3.07 | 1.23 | 0.65 | 0.78 | 0.73 | 0.93 |
| 73 | 2 | 10 | 3.07 | 0.61 | 0.65 | 0.88 | 0.83 | 0.94 |
| 74 | 2 | 20 | 3.07 | 0.31 | 0.65 | 0.92 | 0.89 | 0.96 |
| 75 | 2 | 5 | 5.12 | 2.05 | 0.39 | 0.81 | 0.66 | 0.81 |
| 76 | 2 | 10 | 5.12 | 1.02 | 0.39 | 0.85 | 0.71 | 0.83 |
| 77 | 2 | 20 | 5.12 | 0.51 | 0.39 | 0.95 | 0.77 | 0.81 |
| 78 | 3 | 20 | 5.12 | 0.77 | 0.59 | 0.88 | 0.85 | 0.97 |
| 79 | 2 | 5 | 7.16 | 2.86 | 0.28 | 0.83 | 0.60 | 0.72 |
| 80 | 2 | 10 | 7.16 | 1.43 | 0.28 | 0.81 | 0.59 | 0.73 |
| 81 | 2 | 20 | 7.16 | 0.72 | 0.28 | 0.91 | 0.67 | 0.73 |
| 82 | 3 | 20 | 8.18 | 1.23 | 0.37 | 0.84 | 0.70 | 0.83 |
| 83 | 3 | 20 | 11.24 | 1.69 | 0.27 | 0.71 | 0.53 | 0.75 |
| 84 | 2 | 5 | 11.24 | 4.50 | 0.18 | 0.84 | 0.54 | 0.64 |
| 85 | 3 | 20 | 17.36 | 2.60 | 0.17 | 0.47 | 0.35 | 0.76 |
| 86 | 3 | 10 | 17.36 | 5.21 | 0.17 | 0.56 | 0.37 | 0.66 |
| 87 | 3 | 5 | 17.36 | 10.42 | 0.17 | 0.63 | 0.43 | 0.68 |

TABLE 4

| Display Device No. | w | t | bfl | (w × bfl)/t | \|w/bfl\| | U0 | U5 | U5/U0 |
|---|---|---|---|---|---|---|---|---|
| 88 | 3 | 5 | 17.36 | 10.42 | 0.17 | 0.63 | 0.43 | 0.68 |
| 89 | 1 | 5 | 2.04 | 0.41 | 0.49 | 0.91 | 0.87 | 0.96 |
| 90 | 1 | 5 | 3.06 | 0.61 | 0.33 | 0.94 | 0.76 | 0.81 |
| 91 | 1 | 5 | 4.08 | 0.82 | 0.25 | 0.90 | 0.68 | 0.75 |
| 92 | 1 | 10 | 2.04 | 0.20 | 0.49 | 0.90 | 0.84 | 0.93 |
| 93 | 1 | 10 | 3.06 | 0.31 | 0.33 | 0.94 | 0.76 | 0.81 |

TABLE 4-continued

| Display Device No. | w | t | bfl | (w × bfl)/t | \|w/bfl\| | U0 | U5 | U5/U0 |
|---|---|---|---|---|---|---|---|---|
| 94 | 1 | 10 | 4.08 | 0.41 | 0.25 | 0.92 | 0.66 | 0.72 |
| 95 | 1 | 20 | 2.04 | 0.10 | 0.49 | 0.89 | 0.84 | 0.94 |
| 96 | 1 | 20 | 3.06 | 0.15 | 0.33 | 0.94 | 0.77 | 0.82 |
| 97 | 1 | 20 | 4.08 | 0.20 | 0.25 | 0.92 | 0.66 | 0.72 |
| 98 | 2 | 5 | 4.08 | 1.63 | 0.49 | 0.78 | 0.73 | 0.93 |
| 99 | 2 | 5 | 6.12 | 2.45 | 0.33 | 0.81 | 0.66 | 0.81 |
| 100 | 2 | 10 | 4.08 | 0.82 | 0.49 | 0.88 | 0.83 | 0.94 |
| 101 | 2 | 10 | 6.12 | 1.22 | 0.33 | 0.85 | 0.71 | 0.83 |
| 102 | 2 | 10 | 8.16 | 1.63 | 0.25 | 0.81 | 0.59 | 0.73 |
| 103 | 2 | 20 | 4.08 | 0.41 | 0.49 | 0.92 | 0.89 | 0.96 |
| 104 | 2 | 20 | 6.12 | 0.61 | 0.33 | 0.95 | 0.77 | 0.81 |
| 105 | 2 | 20 | 8.16 | 0.82 | 0.25 | 0.91 | 0.67 | 0.73 |
| 106 | 3 | 20 | 6.12 | 0.92 | 0.49 | 0.88 | 0.85 | 0.97 |
| 107 | 3 | 20 | 9.18 | 1.38 | 0.33 | 0.84 | 0.70 | 0.83 |
| 108 | 3 | 20 | 12.24 | 1.84 | 0.25 | 0.71 | 0.53 | 0.75 |
| 109 | 3 | 5 | −9.18 | −5.51 | 0.33 | 0.89 | 0.67 | 0.76 |
| 110 | 3 | 5 | −6.12 | −3.67 | 0.49 | 0.76 | 0.69 | 0.91 |
| 111 | 3 | 10 | −12.24 | −3.67 | 0.25 | 0.89 | 0.65 | 0.73 |
| 112 | 2 | 5 | −8.16 | −3.27 | 0.25 | 0.92 | 0.67 | 0.73 |

TABLE 5

| Display Device No. | w | t | bfl | (w × bfl)/t | \|w/bfl\| | U0 | U5 | U5/U0 |
|---|---|---|---|---|---|---|---|---|
| 113 | 2 | 5 | −6.12 | −2.45 | 0.33 | 0.94 | 0.76 | 0.81 |
| 114 | 3 | 10 | −6.12 | −1.84 | 0.49 | 0.89 | 0.85 | 0.95 |
| 115 | 3 | 20 | −12.24 | −1.84 | 0.25 | 0.91 | 0.66 | 0.73 |
| 116 | 2 | 5 | −4.08 | −1.63 | 0.49 | 0.91 | 0.84 | 0.93 |
| 117 | 2 | 10 | −8.16 | −1.63 | 0.25 | 0.93 | 0.67 | 0.72 |
| 118 | 3 | 20 | −9.18 | −1.38 | 0.33 | 0.96 | 0.78 | 0.81 |
| 119 | 2 | 10 | −6.12 | −1.22 | 0.33 | 0.95 | 0.76 | 0.80 |
| 120 | 3 | 20 | −6.12 | −0.92 | 0.49 | 0.93 | 0.89 | 0.96 |
| 121 | 1 | 5 | −4.08 | −0.82 | 0.25 | 0.93 | 0.67 | 0.73 |
| 122 | 2 | 10 | −4.08 | −0.82 | 0.49 | 0.91 | 0.86 | 0.95 |
| 123 | 2 | 20 | −8.16 | −0.82 | 0.25 | 0.92 | 0.67 | 0.72 |
| 124 | 1 | 5 | −3.06 | −0.61 | 0.33 | 0.94 | 0.76 | 0.81 |
| 125 | 2 | 20 | −6.12 | −0.61 | 0.33 | 0.94 | 0.87 | 0.93 |
| 126 | 1 | 5 | −2.04 | −0.41 | 0.49 | 0.90 | 0.85 | 0.95 |
| 127 | 1 | 10 | −4.08 | −0.41 | 0.25 | 0.92 | 0.67 | 0.73 |
| 128 | 2 | 20 | −4.08 | −0.41 | 0.49 | 0.92 | 0.88 | 0.96 |
| 129 | 1 | 10 | −3.06 | −0.31 | 0.33 | 0.94 | 0.77 | 0.82 |
| 130 | 1 | 10 | −2.04 | −0.20 | 0.49 | 0.90 | 0.86 | 0.95 |
| 131 | 1 | 20 | −4.08 | −0.20 | 0.25 | 0.92 | 0.67 | 0.73 |
| 132 | 1 | 20 | −3.06 | −0.15 | 0.33 | 0.95 | 0.78 | 0.82 |
| 133 | 1 | 20 | −2.04 | −0.10 | 0.49 | 0.91 | 0.87 | 0.95 |
| 134 | 3 | 20 | 18.37 | 2.76 | 0.16 | 0.47 | 0.35 | 0.76 |
| 135 | 2 | 5 | 12.24 | 4.90 | 0.16 | 0.84 | 0.54 | 0.64 |
| 136 | 3 | 10 | 18.37 | 5.51 | 0.16 | 0.56 | 0.37 | 0.66 |
| 137 | 3 | 5 | 18.37 | 11.02 | 0.16 | 0.63 | 0.43 | 0.68 |

Figure 22A:
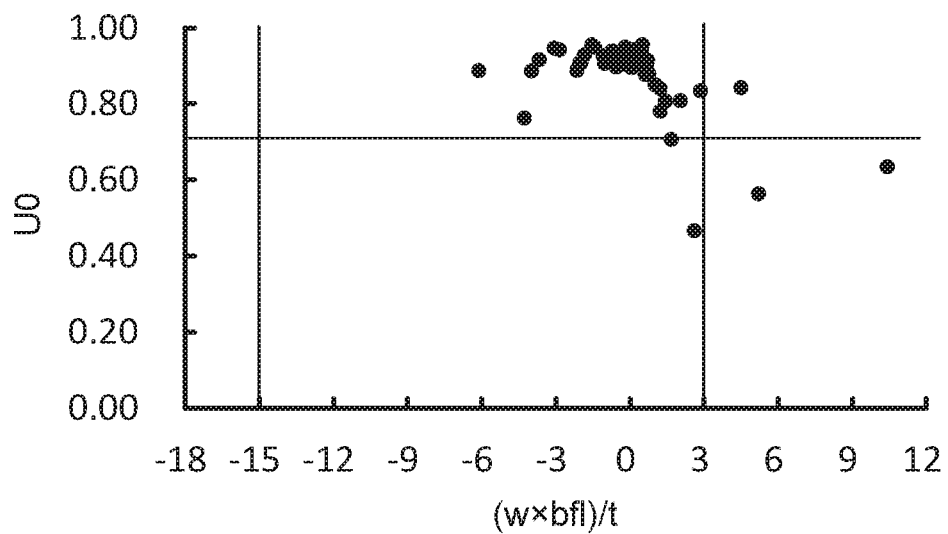
FIG. 22A is a graph illustrating a relationship between uniformity U0 and (w×bfl)/t in another display device in which a convex lens surface or a concave lens surface are disposed on a third incidence surface side.
Figure 22B:
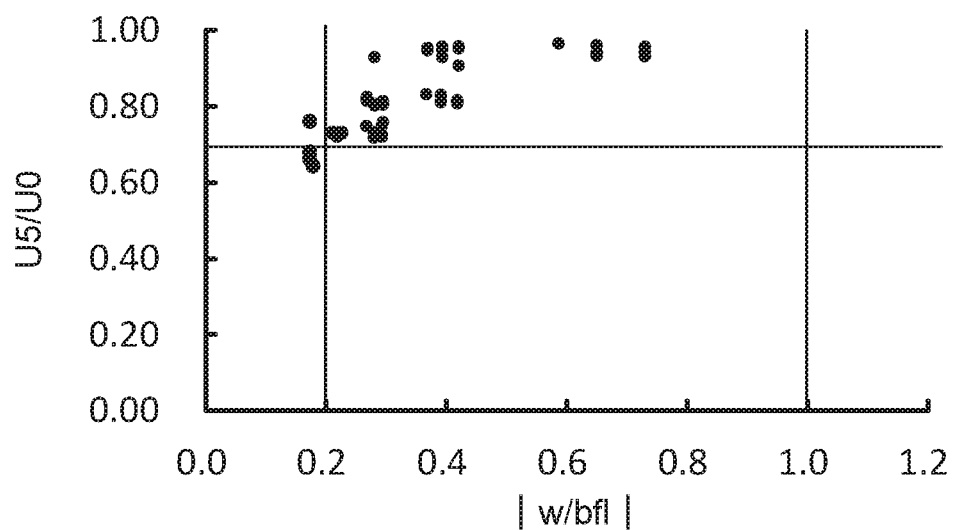
FIG. 22B is a graph illustrating a relationship between uniformity ratio U5/U0 and |w/bfl| in a display device.
Figure 23A:
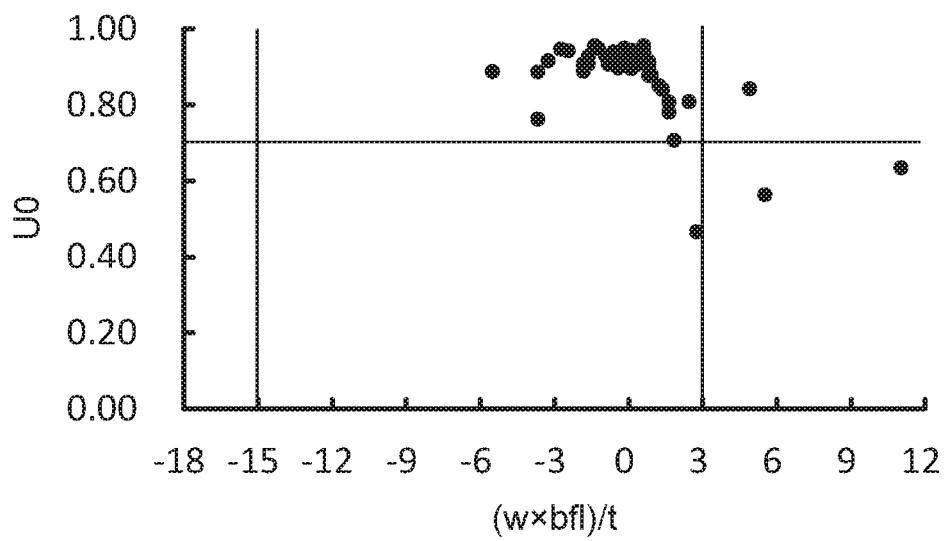
FIG. 23A is a graph illustrating a relationship between uniformity U0 and (w×bfl)/t in another display device in which a convex lens surface or a concave lens surface is disposed on a third emission surface side.
Figure 23B:
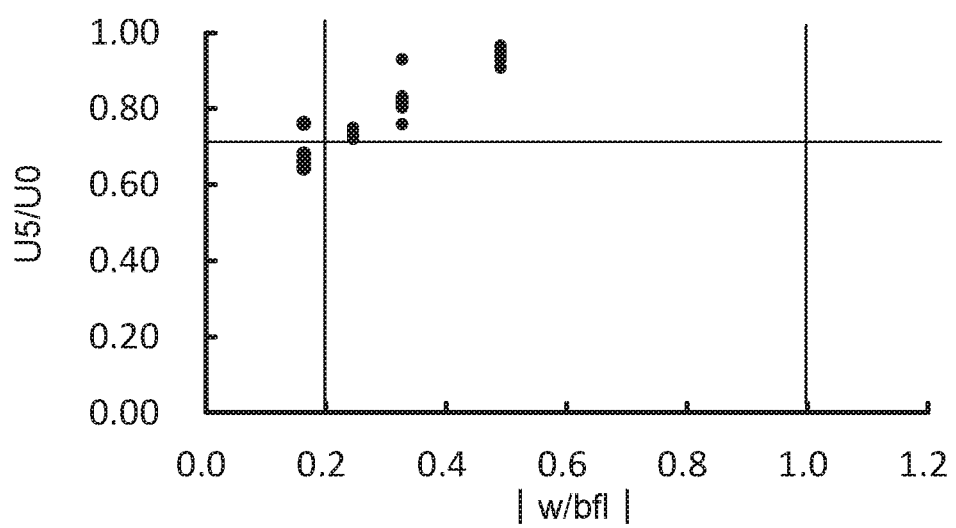
FIG. 23B is a graph illustrating a relationship between uniformity ratio U5/U0 and |w/bfl| in a display device.

FIGS. 22A and 22B are plots of the results collected in Tables 2 and 3, and FIGS. 23A and 23B are plots of the results collected in Tables 4 and 5. FIG. 22A is a graph illustrating the relationship between uniformity U0 and (w×bfl)/t in the case where a plurality of convex lens surfaces or a plurality of concave lens surfaces are disposed on the third incidence surface side, and FIG. 22B is a graph illustrating the relationship between uniformity ratio U5/U0 and |w/bfl| in the case where a plurality of convex lens surfaces or a plurality of concave lens surfaces are disposed on the third incidence surface side. FIG. 23A is a graph illustrating the relationship between uniformity U0 and (w×bfl)/t a plurality of convex lens surfaces or a plurality of concave lens surfaces are disposed on the third emission surface side, and FIG. 23B is a graph illustrating the relationship between uniformity ratio U5/U0 and |w/bfl| in the case where a plurality of convex lens surfaces or a plurality of concave lens surfaces are disposed on the third emission surface side. In FIGS. 22A and 23A, the abscissa indicates (w×bfl)/t, and the ordinate indicates uniformity U0. In FIGS. 22B and 23B, the abscissa indicates |w/bfl|, and the ordinate indicates uniformity ratio U5/U0.

As illustrated in Tables 2 and 3 and FIGS. 22A and 22B, in the case where the third light flux controlling member including a convex lens surface is disposed in the third incidence surface is used, (w×bfl)/t is required to be greater than −15 and smaller than 3, and |w/bfl| is required to be greater than 0.2 and smaller than 1.0 in order to set uniformity U0 required for the use in an HUD to 0.7 or greater, and set the uniformity ratio U5/U0 to 0.7 or greater.

For example, in the display device No. 84, the uniformity ratio U5/U0 that is an index for the case where the diffusion member is viewed in an oblique direction was 0.64, failing to meet the index required for the use in an HUD. However, uniformity U0 that is an index for the case where the diffusion member is viewed from the front side was 0.84, meeting the reference required for the use in an HUD. In addition, in the display device No. 85, the uniformity ratio U5/U0 that is an index for the case where the diffusion member is viewed in an oblique direction was 0.76, whereas uniformity U0 that is an index for the case where the diffusion member is viewed from the front side was 0.47. In addition, the display devices No. 86 and 87 did not meet the uniformity ratio U5/U0 that is an index for the case where the diffusion member is viewed in an oblique direction, or uniformity U0 that is an index for the case where the diffusion member is viewed from the front side.

In addition, as illustrated in Tables 4 and 5 and FIGS. 23A and 23B, in the case where the third light flux controlling member including the concave lens surface is disposed in the third incidence surface is used, (w×bfl)/t is required to be greater than −15 and smaller than 3, and |w/bfl| is required to be greater than 0.2 and smaller than 1.0 in order to set uniformity U0 required for the use in an HUD to 0.7 or greater, and to set the uniformity ratio U5/U0 to 0.7 or greater.

For example, in display device No. 134, the uniformity ratio U5/U0 that is an index for the case where the diffusion member is viewed in an oblique direction was 0.76, meeting the reference required for the use in an HUD. However, uniformity U0 that is an index for the case where the diffusion member is viewed from the front side was 0.47, failing to meet the index required for the use in an HUD. In addition, in display device No. 135, the uniformity ratio U5/U0 that is an index for the case where the diffusion member is viewed in an oblique direction was 0.64, whereas uniformity U0 that is an index for the case where the diffusion member is viewed from the front side was 0.84. In addition, the display devices No. 136 and 137 do not meet the uniformity ratio U5/U0 that is an index for the case where the diffusion member is viewed in an oblique direction, or uniformity U0 that is an index for the case where the diffusion member is viewed from the front side.

As described above, it was confirmed that small luminance unevenness and uniform illumination can be achieved when −15<(w×bfl)/t<3 is met where w is the width of the concave lens surface or the convex lens surface in the cross section including the third central axis, t is the distance between the diffusion member and the intersection of the center line of the convex lens surface or the concave lens surface and the surface of the third light flux controlling member on the diffusion member side, and bfl is a length between the focal point of the convex lens surface or the concave lens surface and the intersection of the center line of the convex lens surface or the concave lens surface and the surface of the third light flux controlling member on the diffusion member side; and when 0.2<|w/bfl|<1.0 is met where w is the width of the convex lens surface or the concave lens surface in the cross section including the third central axis, and bfl is a length between the focal point of the convex lens surface or the concave lens surface and the intersection of the center line of the convex lens surface or the concave lens surface and the surface of the third light flux controlling member on the diffusion member side.

Note that, in the above-described example, a plurality of convex or concave lens surfaces are disposed in the third emission surface or the third incidence surface of third light flux controlling member, this is not limitative, and a plurality of convex lens surfaces or a plurality of concave lens surfaces may be formed in both the third incidence surface and the third emission surface. For example, conceivable configurations include a configuration in which convex lens surfaces are formed in one surface, and a plurality of concave lens surfaces are formed in the other surface at a pitch same as that of the one surface, and a configuration in which the convex lens surfaces or the concave lens surfaces are formed in both the third incidence surface and the third emission surface at the same pitch. In this case, the lenses are formed such that, in the relationship between the lens power and the distance bfl between the focal point of the lenses on both sides of the third light flux controlling member and the point that intersects the central axis of the lens surface in the third emission surface, bfl has a positive value when the power of the double-sided lens of the third incidence surface and the third emission surface is positive, and bfl has a negative value when the lens power is negative, and, the conditions (Expressions (7) and (8)) required for the third light flux controlling member of the present invention are satisfied.

This application is entitled to and claims the benefit of Japanese Patent Application No. 2016-243414 filed on Dec. 15, 2016, and Japanese Patent Application No. 2017-048871 filed on Mar. 14, 2017, the disclosure each of which including the specification, drawings and abstract is incorporated herein by reference in its entirety.

INDUSTRIAL APPLICABILITY

The surface light source device according to the present invention is useful as a light source of a head-up display (HUD), for example. In addition, the display device according to the present invention is useful as a head-up display (HUD) and the like, for example.

REFERENCE SIGNS LIST

10 Surface light source device
11 Substrate
12 LED
14 Lens array
15 Diffusion member
16 Boundary line
17 Irregular part
100 Display device
110 Surface light source device
111 Substrate
112 Light-emitting element
113 Light flux controlling member
114 First light flux controlling member
115 Second light flux controlling member
116, 216 Third light flux controlling member
120 Display member 121 Display region
130 Light-emitting device
131 First incidence surface
132 First emission surface
132a First inner emission surface
132b First outer emission surface
133 First flange
134 First recess
140 Diffusion member
141 Second incidence surface
142 Second emission surface
143 Second flange
145 Fresnel lens part
146 Protrusion
147 Refracting surface
148 Connection surface
151 Third incidence surface
152 Third emission surface
153 Convex lens surface
154 Third flange
155 Concave lens surface
CA Central axis
CA1 First central axis
CA2 Second central axis
CA3 Third central axis
OA Optical axis

The invention claimed is:

1. A surface light source device, comprising:
a light-emitting device including a plurality of light-emitting elements and a light flux controlling member including a first light flux controlling member, a second light flux controlling member and a third light flux controlling member, the light flux controlling member being configured to control a distribution of light emitted from the plurality of light-emitting elements; and
a diffusion member disposed with an air layer interposed between the diffusion member and the light-emitting device, the diffusion member being configured to be irradiated with light emitted from the light-emitting device,
wherein the first light flux controlling member includes:
a first incidence surface having a concave shape, the first incidence surface being disposed opposite the plurality of light-emitting elements so as to intersect a first central axis of the first light flux controlling member, and
a first emission surface disposed opposite the first incidence surface and including an inner emission surface and an outer emission surface having a convex shape in a cross section including the first central axis, the inner emission surface being disposed so as to intersect the first central axis, the outer emission surface being disposed so as to surround the inner emission surface,
wherein the second light flux controlling member controls light emitted from the first light flux controlling member such that the light emitted from the first light flux controlling member travels in a direction along the first central axis,
wherein the third light flux controlling member includes:
a third incidence surface configured to allow incidence of light emitted from the second light flux controlling member, and
a third emission surface disposed opposite the third incidence surface,
wherein a plurality of convex lens surfaces or a plurality of concave lens surfaces are two-dimensionally arranged in the third incidence surface or the third emission surface, each of the plurality of convex lens surfaces having a convex shape in a cross section including a third central axis of the third light flux controlling member, and each of the plurality of concave lens surfaces having a concave shape in the cross section including the third central axis of the third light flux controlling member, and
wherein the following Expression (1), Expression (2) and Expression (3) are satisfied:

$-0.6 < d/f < 0$ ... (1)
$0 < w2/t < 0.85$ ... (2)
$0.4 < w/R < 1.4$ ... (3)

where f is a focal length of the first light flux controlling member, d is a distance between the first central axis and an optical axis of one of the plurality of the light-emitting elements that is remotest from the first central axis among the plurality of the light-emitting elements, w is a width of the convex lens surface or the concave lens surface in the cross section including the third central axis, R is a curvature radius of the convex lens surface or the concave lens, and t is a distance between the diffusion member and an intersection of a center line of the convex lens surface or the concave lens surface and one surface of the third light flux controlling member, the one surface of the third light flux controlling member being located on a diffusion member side.

2. The surface light source device according to claim 1, wherein the second light flux controlling member includes:
a second incidence surface disposed opposite the first emission surface; and
a second emission surface disposed opposite the second incidence surface and including a refractive Fresnel lens part configured to emit incident light such that the incident light travels in a direction along the first central axis.

3. The surface light source device according to claim 1, wherein the first central axis, a second central axis of the second light flux controlling member, and the third central axis coincide with each other.

4. The surface light source device according to claim 3, wherein the first incidence surface and the first emission surface are rotationally symmetrical about the first central axis as a rotation axis; and
wherein the second incidence surface and the second emission surface are rotationally symmetrical about the second central axis as a rotation axis.

5. The surface light source device according to claim 1, wherein the plurality of light-emitting elements are disposed such that a total light flux axis of the plurality of light-emitting elements coincides with the first central axis and the second central axis, the total light flux axis being a center of a total light flux emitted from the plurality of light-emitting elements;
wherein an intensity of light emitted from each of the plurality of light-emitting elements is greatest in the direction along the first central axis; and
wherein Expression (4) to Expression (6) are further satisfied when $\theta 1$, $\theta 2$ and $\theta 3$ are set such that, in a cross section including the first central axis and the second central axis:
$\theta 1$ is an emission angle of a first light beam emitted from a virtual emission point, the virtual emission point being an intersection of the total light flux axis and extensions of light-emitting surfaces of the plurality of light-emitting elements, θ2 is an angle, with respect to the first central axis, of a second light beam that is generated when the first light beam that has been controlled by the first light flux controlling member is emitted from the first light flux controlling member, and θ3 is an angle, with respect to the first central axis of a third light beam that is generated when the second light beam that has been controlled by the second light flux controlling member is emitted from the second light flux controlling member, wherein the Expression (4) to Expression (6) are:

$$\frac{\Delta(\theta 2_{n+1} - \theta 2_n)}{\Delta(\theta 1_{n+1} - \theta 1_n)} > 0 \quad (4)$$

where $0° < \theta 1_n < \theta 1_{n+1} < 60°$, $\theta 2_n$ being an angle of a light beam corresponding to $\theta 1_n$ $$\frac{\Delta(\theta 2_n - \theta 2_{n-1})}{\Delta(\theta 1_n - \theta 1_{n-1})} \geq \frac{\Delta(\theta 2_{n+1} - \theta 2_n)}{\Delta(\theta 1_{n+1} - \theta 1_n)} \quad (5)$$

where $0° < \theta 1_{n-1} < \theta 1_n < \theta 1_{n+1} < 60°$ $-6° < \theta 3 < 10°$ ... (6) where $0° < \theta 1 < 40°$, $\theta 3$ being an angle of a light beam corresponding to $\theta 1$, $\theta 3$ being set such that, when an angle of light travelling in parallel with the first central axis is set to 0°, an angle, with respect to the first central axis, of the third light beam approaching the first central axis has a negative value, whereas an angle, with respect to the first central axis, of the third light beam travelling away from the first central axis has a positive value.

6. The surface light source device according to claim 1, wherein the convex lens surface is:
a first curved surface that includes a ridgeline linearly extending in a first direction that is perpendicular to a thickness direction of the third light flux controlling member, the first curved surface having a curvature only in a second direction that is perpendicular to the thickness direction and the first direction; or
a second curved surface that has a curvature in any cross section including a central axis of the convex lens surface.

7. The surface light source device according to claim 1, wherein Expression (7) and Expression (8) are further satisfied in a case where, when the third light flux controlling member includes the plurality of convex lens surfaces, a length between a focal point of each convex lens surface and an intersection of the center line of each convex lens surface and one surface of the third light flux controlling member is set to bfl of a positive value, whereas when the third light flux controlling member includes the plurality of concave lens surfaces, a length between a focal point of each concave lens surface and an intersection of the center line of each concave lens surface and one surface of the third light flux controlling member is set to bfl of a negative value, the one surface of the third light flux controlling member being located on a diffusion member side,
wherein the Expression (7) and Expression (8) are:
$-15 < (w \times bfl)/t < 3$ ... (7)
$0.2 < |w/bfl| < 1.0$ ... (8).

8. A display device, comprising:
the surface light source device according to claim 1; and
a display member that is irradiated with light emitted from the surface light source device.

* * * * *